United States Patent
Slupphaug et al.

(10) Patent No.: US 9,141,114 B2
(45) Date of Patent: Sep. 22, 2015

(54) METHOD AND A SYSTEM FOR FEEDBACK CONTROL OR MONITORING OF AN OIL OR GAS PRODUCTION SYSTEM AND COMPUTER PROGRAM PRODUCT

(75) Inventors: Olav Slupphaug, Oslo (NO); Dag Kristiansen, Oslo (NO); Bjørn Bjune, Oslo (NO); Veslemøy Kristiansen, Oslo (NO); Jostein Moe, Oslo (NO)

(73) Assignee: ABB Research Ltd. (CH)

( * ) Notice: Subject to any disclaimer, the term of this patent is extended or adjusted under 35 U.S.C. 154(b) by 1265 days.

(21) Appl. No.: 12/282,204

(22) PCT Filed: Mar. 8, 2007

(86) PCT No.: PCT/IB2007/000547
§ 371 (c)(1),
(2), (4) Date: Jan. 12, 2009

(87) PCT Pub. No.: WO2007/102079
PCT Pub. Date: Sep. 13, 2007

(65) Prior Publication Data
US 2009/0149969 A1    Jun. 11, 2009

(30) Foreign Application Priority Data
Mar. 9, 2006   (NO) .................................. 20061141

(51) Int. Cl.
*G05D 7/06* (2006.01)
(52) U.S. Cl.
CPC .................................. *G05D 7/0635* (2013.01)

(58) Field of Classification Search
CPC . G05D 7/0617; G05D 7/0623; G05D 7/0635; G05D 7/0676; G05D 16/02; G05D 16/16; G05D 16/2013
USPC .............................. 702/282, 12; 700/281–282
See application file for complete search history.

(56) References Cited

U.S. PATENT DOCUMENTS 4,872,351 A * 10/1989 Ruesch ...................... 73/861.04
5,014,789 A    5/1991 Clarke et al.
(Continued)

FOREIGN PATENT DOCUMENTS

GB       2342108 A      4/2000
JP    06207680 A  *  7/1994
(Continued)

OTHER PUBLICATIONS

H.H.J. Bloemen, Soft Sensing for Gas-Lift Wells, Sep. 26, 2004, SPE International, SPE 90370, p. 1.*
(Continued)

Primary Examiner — Mohammad Ali
Assistant Examiner — Nathan L Laughlin
(74) Attorney, Agent, or Firm — Whitmyer IP Group LLC

(57) ABSTRACT

A method for automatic feedback control and/or monitoring of an oil and/or gas production system, or part(s) thereof, which includes one or more processing unit(s) and/or one or more flow line(s) and/or one or more controls. The method includes measuring or estimating value(s) of at least one level or pressure or flow rate or load indicator associated with at least one of the processing unit(s) and/or flow line(s) and at least one of calculating setting(s) for the controls based on at least one controlled variable in form of the measured or estimated level or pressure or flow rate or load indicator, including compensating for nonlinearities of the control means or estimating at least one of the oil-, gas-, water-, or liquid flow rate(s) into and/or out of at least one of the processing units and/or flow line(s).

33 Claims, 12 Drawing Sheets

(56) References Cited

U.S. PATENT DOCUMENTS

| | | | |
|---|---|---|---|
| 5,544,672 A * | 8/1996 | Payne et al. | 137/1 |
| 6,434,435 B1 * | 8/2002 | Tubel et al. | 700/30 |
| 6,445,980 B1 * | 9/2002 | Vyers | 700/282 |
| 7,079,952 B2 * | 7/2006 | Thomas et al. | 702/13 |
| 7,434,621 B2 | 10/2008 | Aarvik et al. | |
| 7,740,024 B2 * | 6/2010 | Brodeur et al. | 137/12 |
| 2001/0037670 A1 * | 11/2001 | Boger et al. | 73/1.72 |
| 2005/0027377 A1 * | 2/2005 | Lucas et al. | 700/28 |
| 2006/0186027 A1 * | 8/2006 | Geneys et al. | 210/150 |
| 2007/0006727 A1 * | 1/2007 | Gysling | 95/1 |

FOREIGN PATENT DOCUMENTS

| | | |
|---|---|---|
| NO | 320427 B1 | 12/2005 |
| WO | WO 01/06091 A1 | 1/2001 |
| WO | WO 01/34940 A2 | 5/2001 |
| WO | WO 02/46577 A1 | 6/2002 |
| WO | WO 2006/003118 A1 | 1/2006 |
| WO | 2006120537 A2 | 11/2006 |

OTHER PUBLICATIONS

International Search Report, dated Jul. 3, 2007, issued in connection with counterpart Application PCT/IB2007/000547.

Written Opinion of the International Searching Authority, dated Jul. 3, 2007, issued in connection with counterpart Application PCT/IB2007/000547.

Norwegian Search Report, dated Sep. 28, 2006, issued in connection with counterpart Norwegian Application No. 20061141.

Schmidt, et al., "Choking can eliminate severe pipeline slugging," *Oil & Gas Journal*, pp. 230-238, Nov. 12, 1979.

McDonald, et al., "Optimal Averaging Level Control," *AIChE Journal*, vol. 32, No. 1, pp. 75-86, Jan. 1986.

Xu, et al., "Simulation study and field measurement for mitigation of slugging problem in The Hudson Transportation Lines," *BHR Group 1997 Multiphase '97*, pp. 497-512, 1997.

Almeida, et al., "Venturi for severe slug elimination," *BHR Group 1999 Multiphase '99*, pp. 149-158, 1999.

Molyneux, et al., "Characterization and active control of slugging in a vertical riser," *BHR Group 2000 Multiphase Technology*, pp. 161-172, 2000.

Havre, et al., "Taming slug flow in pipelines," *ABB Review 2000*, pp. 55-63, 2000.

Havre, Kjetil, "Active Feedback Control as the Solution to Severe Slugging," Society of Petroleum Engineers, Inc., 2001 SPE Annual Technical Conference and Exhibition, New Orleans, LA, Sep. 30-Oct. 3, 2001.

Proceedings of the 2001 Engineering Technology Conference on Energy ETCE2001, Part A, The American Society of Mechanical Engineers, Houston, TX, Feb. 5-7, 2001.

Godhavn, John-Morten, et al., "Increased Oil Production by Advanced Control of Receiving Facilities," IFAC 2005.

Shinskey, F.G., et al., "Control Systems—Cascade Loops", CRC Press, 1995.

Bakken, Asbjorn, et al., "Flow Management—Experience and Challenges," Innovative Technologies, Creative Solutions, Petronics Workshop, Trondheim, Norway, Jun. 15-16, 2004.

Dalsmo, M., et al., "Active Feedback Control of Unstable Wells at the Brage Field," Society of Petroleum Engineers, Inc., 2002.

European Search Report Application No. EP 07 73 3927 Completed: Aug. 26, 2014; Mailing Date: Sep. 1, 2014 6 pages.

* cited by examiner

METHOD AND A SYSTEM FOR FEEDBACK CONTROL OR MONITORING OF AN OIL OR GAS PRODUCTION SYSTEM AND COMPUTER PROGRAM PRODUCT

CROSS-REFERENCE TO RELATED APPLICATIONS

This application claims priority to Norwegian patent application 20061141 filed 9 Mar. 2006 and is the national phase under 35 U.S.C. §371 of PCT/IB2007/000547 filed 8 Mar. 2007.

FIELD OF THE INVENTION

The present invention relates to a method for automatic feedback control and/or monitoring of oil and gas production systems. The invention also relates to a control system for carrying out the inventive method and a computer program product for executing one or more steps of the inventive method.

The term oil and gas production system as used in this application should be understood to include all components of a system for gathering and processing oil and/or gas such as the gathering system with its wells, chokes, flow lines, pumps, compressors, manifolds, pipelines, etc., and processing facilities which include equipment as separators, coalescers, hydra cyclones, heat exchangers, scrubbers, control valves, compressors, turbines, pumps, etc. The different components may be placed subsea, on a platform, on a ship, or on-shore.

BACKGROUND OF THE INVENTION AND PRIOR ART

Production throughput and regularity are two of the most important key performance indicators in an oil and gas production system. Production throughput is intended to mean the oil and/or gas and/or water and/or liquid and/or total mass production per time interval (or, flow rate(s)), whilst regularity is intended to mean the production system's ability to meet the demands and quality requirements for intermediate or final product deliveries. The throughput and regularity depend on many different factors, some may be specific to each production system, others more general. One important and general factor in any oil and gas production system is how flow rate variations are mitigated or smoothened throughout the system. This is especially important when large flow rate disturbances are entering processing facilities in the production system and are directly connected to liquid levels and gas pressure control in the processing facility's buffer tanks. The structure and tuning of the associated control method directly affect the production system's throughput and regularity. By tuning it is meant the choice of parameters in the algorithms which constitutes the control method. Examples of buffer tanks or vessels or drums include, but are not restricted to, two/three phase separators, slug catchers, degassing drums, coalescers, inline degassers, inline deliquidisers, and scrubbers.

Disturbances in terms of variations in the oil, water, liquid, and/or gas flow rates entering the buffer tanks often cause problems for the liquid level and gas pressure controllers. The disturbances may be the results of Terrain or riser induced slugging, also called severe slugging, see e.g. WO 02/46577.

Hydrodynamic slugging, that is, high-frequency slug flow as results of too large difference in the gas and liquid velocities.

Pigging of the pipeline. Pigging is an operation that is applied to pipelines for several reasons, such as inspection, application of chemicals like corrosion inhibitors, removal of solids or liquids, and so on. The pig is a mechanical device that is placed in the pipeline and is transported through the pipeline driven by the pressure difference and/or by a local motor. The pig sweeps up the liquid as it progresses through the pipeline and thus slug flow ensues.

Operational changes, such as switching between wells with different characteristics (for example different gas-oil ratios, water-cuts, etc.), or changes in well choke openings.

Trips or complete or partial un-planned shutdowns often result due to such disturbances. Avoiding such situations are of great importance. In addition, in order to maximize the throughput and regularity of the production system, the flow rate variations throughout the system should be kept as small as possible by, for example, the buffer tanks' control system. This to not upset the processing facility more than necessary and in order to fulfill the quality requirements on processed oil, water, and gas. A typical example of a tightly tuned level controller (LIC) is shown in FIG. 17. This level controller aggressively tries to maintain a constant liquid level. The implication is that there is no mitigation of the disturbances entering the buffer tank. This again might cause problems for downstream processing units and equipment. It should be noted that large flow rate variations in the processing facility do not necessarily have to be caused by large flow rate variations entering the processing facility. It might be the result of poor tuning and/or unfortunate structure of the buffer tank controllers. This is illustrated in FIG. 18, where the level controller (LIC) amplifies the variations in the liquid flow entering the buffer tank.

At first glance, the two examples shown in FIG. 17 and FIG. 18 might seem easy to prevent by just performing a retuning of the controllers. Usually, the level and gas controllers are ordinary linear PID (Proportional+Integral+Derivative) controllers, which may be described by the following equation:

$$u = K_P \left( e + \frac{1}{T_i} \int_{T_i} e(\tau)d\tau + T_d \dot{e} \right) \qquad (1)$$

where u is the commanded valve opening, e is the control error (set point minus controlled variable measurement). Retuning means changing the controller parameters $K_P$, $T_i$, and $T_d$. This might of course improve the mitigation of the flow rate variations. However, the improvement will often be only temporary. That is, when the operating conditions change, the controllers with the new controller parameters will again perform poorly. This is due to complicating effects such as nonlinearities as, for example, variable process and valve gains, and interactions/couplings between control means and controlled variables, which a stand-alone plain PID controller is not designed to handle.

EXAMPLE

Variable Control Valve Gain

Any control system should aim at functioning equally well throughout the entire operational range. In an oil and gas processing facility, the behavior of the system to be controlled may depend on flow rates, pressures, levels, etc. An example is the control valve gain, that is, the ratio of the change in flow to the corresponding change in valve opening. This ratio depends on the valve characteristic and the pressure drop across the valve. The pressure drop across the valve depends on the flow rate to a greater or lesser extent.

A standard linear PID controller such as described by equation (1) assumes a linear relationship between a change in the commanded valve opening $\Delta u$ and the corresponding change in the liquid level $\Delta h_{liq}$ (liquid level controller). In other words, in order for the PID controller to work properly over its whole operating range (for valve opening u values between 0 and 100%), the ratio $\Delta h_{liq}/\Delta u$ should be constant. However, this is usually an invalid assumption in an oil and gas production system. This is due to the fact that the valve opening affects the outlet liquid flow that again affects the liquid level and these relationships have normally nonlinear characteristics.

Consider for example the liquid flow $q_{liq}$ through a valve given by the following equation:

$$q_{liq} = C_v^{max} f(u) \sqrt{\frac{\Delta P_v}{g_s}} \quad (2)$$

where

The valve coefficient $C_v^{max}$ is determined by the valve size
f is the valve characteristic
u is the valve opening and takes values between 0 and 100
$\Delta P_v$ is the pressure drop across the valve
$g_s$ is the specific gravity of the liquid
An example of a valve characteristic curve f is for the so-called equal percentage valve:

$$f(u) = R^{\left(\frac{u}{100} - 1\right)}$$

where R is a valve design parameter, usually between 20 and 50. Clearly, the ratio $\Delta q_{liq}/\Delta u$ is non-constant.

EXAMPLE

Variable Process Gain Due to Vessel Geometry

For a buffer tank, the ratio of rate-of-change of liquid level to the corresponding change in the outlet liquid flow depends on the geometry of the vessel. This ratio, $(\Delta h_{liq}/\Delta t)/\Delta q_{liq,out}$, is called process gain and is a function of the liquid surface area. If the liquid surface area is non-constant, and a function of the liquid level, the ratio $(\Delta h_{liq}/\Delta t)/\Delta q_{liq,out}$ will be non-constant ($\Delta t$ is to be interpreted as a small constant scalar). This is called variable process gain.

Both variable valve gain and variable process gain may in the worst cases cause instabilities in the control loops since a set of PID parameters $(K_P, T_i, T_d)$ are usually determined based on (approximately) constant values for the valve and process gains. However, if these gains take values over a large range during normal operating conditions, the implications may be that the controller is only performing worse since the effect of the controller output ($\Delta u$) will be much larger than expected by the controller (cf. FIG. 18). Similarly, for other operating conditions, the effect of the controller output will be much smaller than expected by the controller. In practice, the latter is the same as having no automatic feedback control (open loop).

EXAMPLE

Interactions Between Controlled Variables

Another example of deteriorating effects is interactions between controlled variables. This may result in poor performance and robustness if not accounted for. What this means is that when one single loop controller manipulates its variable, this often also affects and changes other variables. An example is the interaction between the liquid level and the gas pressure in a separator tank. By changing the liquid level, this changes the gas volume, which means that the gas pressure is changed. Often, the buffer control system is designed as a collection of single feedback loops that operate independently. The result is that the gas pressure controller and liquid level controller may be working in opposite directions of each other and the system can in the worst case become unstable.

To summarize the above discussion, mitigation of flow rate variations utilizing all available buffer capacity in an oil and gas production system is a challenge consisting of many problems on different levels. On a top level, the challenge is, for example, to design controllers that minimize flow rate variations out of a buffer tank assuming an ideal system with no interactions and no nonlinearities. On an intermediate level, the problem is, for example, interactions between controlled variables such as oil and water levels and gas pressure. Finally, in order to ensure that the control system works properly under all operating conditions, nonlinearities such as variable valve and process gains should be accounted for.

As illustrated in FIG. 17 and FIG. 18, large flow rate variations may be caused by large flow rate variations entering the processing facility/buffer tanks or generated by the buffer tank control system itself. However, often there are no multiphase flow meters at the outlet of the flow lines which means that there is no direct measurements of the flow rates entering the processing facility. Thus, it is difficult to know the cause of any detected flow rate instability/oscillation in the production system. The flow rate instability can for example be caused by: i) flow disturbances entering the production system, ii) unfortunate tuning and/or structure of the control system (meaning that the control system generates the oscillations or amplifies incoming disturbances), or, iii) the control valves due to their inability to track their controller output signals closely enough.

Further, during ramp-up, including start-up, of oil and gas production there might be significant opportunities for increasing the production throughput faster. The ramp-up is normally performed using bean-up curves describing flow line outlet valve openings as a function of time. These are normally conservative and pre-defined. Hence they do not use on-line measurements from the production system for adjusting the bean-up curve during the ramp-up. This of course affects the accumulated throughput. When the production of oil and gas from a pipeline or a well is to be ramped-up, for example during a production start-up, this must be done without violating any of several constraints found in the production system. Usually these constraints are varying and mapped to constraints on, for example, the pipeline outlet flow, or to the bottom-hole pressure in a well. For example, a dominating constraint during start-up may be heating medium capacity or it could be the liquid receiving capacity in a separator train. This in turn can be used for deciding limits on the pipeline outlet liquid flow as a function of time such that the incoming liquid flow will be kept within the limitations of the receiving facility. A common way of performing the start-up is to map the constraints in the liquid flow to constraints in the production choke opening. Then, a bean-up curve for the production choke opening is made and the start-up is performed according to this bean-up curve in an open-loop and feed-forward manner. This bean-up curve consists of production choke opening values as a function of time. For example, the curve may be as follows (assuming the initial choke opening value is zero): Open the choke to 10%, wait 30 minutes, then open the choke to 15%, wait 20 minutes, then open the choke to 25%, then wait 30 minutes, and so forth. The reasons for doing it in this way is that, based on experience, an operator knows that by allowing the production choke to follow the bean-up curve, one indirectly ensures that the pipeline outlet flow does not become too large or the well flowing bottom-hole pressure does not become too small in too short a time. Clearly, the resulting bean-up curve may be very conservative and sub-optimal, see FIG. 19.

The Applicant is not aware of any overall modular and flexible prior art method that handles all the operational and/or feedback control challenges and problems described above.

There are some proposals in the prior art to solve problems associated with mitigation of slugging effects from flow lines. Some of these works describe the introduction or installation of new equipment for solving the problems. One of these proposals actually deals with installation of equipment in the flow line: The venturi concept disclosed in A. R. Almeida and M.DE.A. Lima Goncales: "Venturi for severe slug elimination" in BHR Group 1999 Multiphase '99. Other proposals include a mini separator called the SSD, a concept by Shell, described in PCT/WO96/00604. All new equipment is costly both for new designs and revamps. Hence, there is a large economic incentive for solutions that do not introduce new equipment and therefore are much cheaper to implement.

Some prior art methods apply measurements in the flow line to either remove or mitigate slugs by using the flow line outlet choke. In the former category, slug removal, there are at least two approaches for terrain induced slugging: choking by Schmidt, Brill and Beggs; 'Choking can eliminate severe pipeline slugging.' Oil and Gas Journal 1979; and active feedback control by Havre, Stornes and Stray: 'Taming slug flow in pipelines', ABB review 2000, Molynex, Tait and Kinvig: 'Characterization and active control of slugging in a vertical riser' BHR Group 2000 Multiphase technology, and others. These approaches are however not applicable for handling hydrodynamic slugging and slugging due to pigging, for example. There are also cases where the measurements that are needed for control and monitoring of a production system are not available to the control system because the necessary metering equipment is not installed.

In the latter category, slug mitigation, the following prior art references of relevance are known to the Applicant:
U.S. Pat. No. 5,014,789 by Clarke et al.
Xu Z. G., P. Gayton, A. Hall and J. Rambaek in BHR Group 1997 Multiphase '97 pp 497-508,
U.S. Pat. No. 5,544,672 by Payne et al.
WO 01/34940 by G. Haandrikman et al., and
K. A. McDonald, T. J. McAvoy, and A. Tits, "Optimal Averaging Level Control", AIChe Journal, vol. 32, no. 1, pp. 75-86, January 1986.

The above references will now be described in the following.

In the U.S. Pat. No. 5,014,789 by Clarke et al. methods for controlling a continuous gas-lift oil well are described which reduce the well outlet valve opening when there are indications of onset of slugging or the monitored fluid flow rate is increasing faster than a predefined value. There are at least two important differences between this US patent and the present invention. A first, and most critical, difference is that the controller described in U.S. Pat. No. 5,014,789 only reduces the rate of opening of the well outflow valve opening if the flow rate increases too fast, whereas the present invention is related to a set point for the flow rate and may be both increasing and decreasing the well outflow valve opening to maintain the flow rate at the set point. A second difference is that changes in the well outflow valve gain are not taken into account.

The article by Xu Z. G., P. Gayton, A. Hall and J. Rambaek describes the use of a proportional controller with level in a first stage separator as input and the choke valve opening as manipulated variable. This controller has a higher set point than a "normal" level controller acting on the outlet valve, but a lower set point than the shutdown limits. A problem here is that the control method or algorithm does not ensure that the valve will be left fully open after the slug has passed, meaning that the outflow from the flow line may be choked even when it is not required to avoid problems in the downstream processing facility. Another problem associated with using a linear proportional controller is that the gain in the controller is constant and not dependent on the gain in the controlled system. However, the gain in the controlled system is continuously changing and depends on the pressure drop across the valve, the valve characteristics, the separator geometry, and the fluid properties. To avoid unstable operation, which in this case results if the product of the controller- and system gain is too large, one is then forced to settle for a low controller gain. This implies that low performance will result or, in other words, that the valve will be closed more than necessary. This is equivalent to unnecessarily low production and throughput and thus undesirable.

The approach taken by Payne et al. as disclosed in U.S. Pat. No. 5,544,672 is quite similar. The slug flow mitigation control system and method herein described, make use of one or more signals from an inlet separator's level controller as an indication that the liquid slug volume is larger than the capacity of the separator to receive it. If so, one will partially close a throttling valve arranged upstream of the separator to a predetermined opening. This predetermined opening is hard to choose. Typically, too small an opening is chosen, and hence unnecessary low production and throughput result. Also, the problem with respect to settling with low performance to avoid unstable operation applies to the downstream separator level feedback part of the method described in this US patent. Further, the method in Payne et al. is based on that the liquid volume of the slug flowing towards the valve is determined, which is not a requirement in the present invention.

WO 01/34940 describes a system for suppressing and controlling liquid slugs and gas surges in a liquid/gas separator. The system adjusts the outlet gas valve set point or the outlet liquid valve set point in response to variations of one or more selected controlled variables, such as outlet gas flow, outlet liquid flow, outlet gas and liquid flow, liquid level, gas pressure, and the control means (outlet gas valve set point or outlet liquid valve set point) is changed automatically from time to time if one or more of the selected controlled variables reach a pre-set threshold value. Hence, one characteristic of this system is the switching between controlled variables. During normal operation, the outlet liquid flow control valve is adjusted such that variations in the liquid level in the separator are minimized. Also, the gas flow control valve is adjusted such that the variations in the sum of the liquid and gas flow rates are minimized.

The paper by K. A. McDonald, T. J. McAvoy, and A. Tits, focuses on liquid flow rate mitigation out of a buffer tank utilizing available liquid buffer capacity for an ideal system. Thus, the authors assume that problems encountered in practice such as variable process and valve gains are not present. Also, this paper only focuses on liquid level and flow control, and problems such as interactions between gas pressure and liquid level when there is a gas pressure controller present are not considered. Further, protection functionality in terms of avoiding tripping the buffer tank due to a large liquid flow rate entering the buffer tank is also not dealt with or indicated in this paper.

To sum up, the simplistic nature of the control methods described in the latter five references implies unnecessary low performance of the associated slug handling/mitigating systems. In addition, none of these references completely address the problem of handling slug flow in that the downstream processing facility may reach its maximum load capacity during either the liquid rate peaks or the gas rate peaks or both and the processing facility inlet need to be choked back in each of these cases.

Maximum load is reached when the flow rate into a processing facility is larger than the capacity of at least one of its processing equipment. This will show up as:
1. A controller output variable in the production system's control system reaches a limit, e.g. a valve is fully open or maximum pump speed is reached.
2. A variable becomes critically high or low (outside given is safety/operational limits). This is often caused by that the production system's control system has lost control of this variable due to that the controller output used to control it has reached its limit, i.e. the variable has become uncontrollable. An example of this could be that a valve which is placed at an outlet of a processing equipment and which the production system's control system uses for pressure control of the processing equipment, becomes fully open, whereby the ability to lower this pressure is lost. It may then become necessary to reduce the inflow to the processing facility to avoid shut-down due to too high a pressure.

In some cases, processing equipment which executes unit operations are provided with safety means, such as interlocking of an upstream processing valve. In this case, the flow from the upstream processing equipment will be reduced and can result in an overload of that equipment. In other cases, the safety means may be a safety valve, which will result in flaring if gas pressure in the processing equipment reaches a predetermined level. The production system is controlled and operated with a plurality of valves, pumps and compressors in addition to other processing equipment and vessels. Typically a critical situation in the production system will occur when a valve becomes fully open/closed or maximum pump or compressor speed is reached.

All of these critical situations may happen in any part of a downstream processing facility. It is thus not sufficient for example to consider only the level and/or pressure in a first stage separator for deciding whether the production system is overloaded or not, and hence if a reduction of the inflow is required. If the inflow to the processing facility is not reduced when there is a capacity problem in any downstream processing equipment, flaring or possibly production system shut-down may result. This is due to that the processing equipment of the production system is typically overlooked by a safety system that will come into action when it detects that selected variables exceed predetermined safety limits. The safety system will then shut down whatever is required to avoid damage to people, equipment and environment.

SUMMARY OF THE INVENTION

It is a main objective of the present invention to provide a method that supports maximization of the production throughput and regularity in an oil and gas production system, or part(s) thereof.

Another objective of the present invention is to provide a method that in an optimized manner protects an oil and gas production system, or part(s) thereof, from being overloaded.

A further objective of the present invention is to provide a method that in an optimized manner mitigates flow rate variations in an oil and gas production system, or part(s) thereof.

Yet another objective of the present invention is to provide a method for an improved ramp-up of an oil and gas production system, or part(s) thereof.

The invention would typically be applied to control and/or monitoring of one or more buffer tanks, vessels or drums and/or the outflow from multiphase fluid flow line(s) in an oil and gas production system. The invention can also typically be applied to mitigate slugging caused by pigging operations related to oil and gas production systems including LPG (Liquefied Petroleum Gas) or LNG (Liquefied Natural Gas) processing facilities.

According to the present invention, the above and other objectives are achieved by a method. The inventive method for automatic feedback control and/or monitoring of an oil and/or gas production system, or part(s) thereof, which includes one or more processing unit(s) and/or one or more flow line(s), and/or one or more control means includes the step of:
  determining, by means of measuring or estimating, value(s) of at least one level or pressure or flow rate or load indicator associated with at least one of said processing unit(s) and/or flow line(s),
and at least one of the following steps depending on the operating conditions/requirements and the production system at hand:
  calculating setting(s), i.e. value(s) of associated set point(s), for said control means based on at least one controlled variable in form of said measured or estimated level or pressure or flow rate or load indicator, including compensating for nonlinearity/nonlinearities of said control means, preferably by using at least one control module,
  estimating at least one of the oil-, gas-, water-, or liquid flow rate(s) into and/or out of at least one of said processing unit(s) and/or flow line(s), preferably by using an estimator module.

Preferably, the step of calculating setting(s) of control means based on at least one of said controlled variable(s), comprises at least one of the following steps:
  mitigating flow rate variations throughout said production system, or part(s) thereof, by utilizing available buffer capacity in said production system, or part(s) thereof, preferably by using an Outflow Smoothening module.
  avoiding that said production system, or part(s) thereof, is being overloaded based on at least said load indicator, while ensuring that the throughput of said production system, or part(s) thereof, is not restricted more than necessary, preferably by using an Overload Avoidance module,
  automatically ramping up the throughput of said production system, or part(s) thereof, preferably by using a Ramp-Up module, based on on-line measurement(s) and/or estimate(s).

The step of compensating for nonlinearities preferably includes, approximately or exactly, canceling unwanted effects of nonlinearities such as changes in process- and/or control means gain(s). The step of compensation could also include canceling unwanted effects of nonlinearities such as stiction, friction, deadband, backlash or hysteresis.

Preferably, the changes in control means gain(s) are canceled based on a calculation of the ratio of change in associated flow rate(s) to change in associated control means setting(s), and the changes in process gain are canceled based on a calculation of the ratio of rate-of-change in controlled variable(s), such as gas pressure(s) and/or liquid level(s), to changes in associated flow rate(s).

The step of mitigating flow rate variation(s) preferably includes:

calculating available buffer capacity based on information about allowable range of variation for controlled variable(s), such as level(s) and/or pressure(s), and measurement(s) and/or estimate(s) of said controlled variable(s). The information about allowable range of variation for the controlled variable(s) is preferably determined either by the method itself or externally or provided by a user.

Preferably, the step of mitigating flow rate variations further includes the step of:

calculating setting(s) for control means that minimizes flow rate variation(s) given the available buffer capacity without restricting the production throughput more than necessary. The step of calculating setting(s) for said control means preferably further includes the step of:
compensating for unwanted couplings between said control means and said controlled variable(s), preferably by using a Decoupling functionality. The calculation of setting(s) is preferably based on a Model Predictive Control (MPC) algorithm and/or a set of PID (Proportional+Integral+Derivative) controllers.

Preferably, the step of avoiding overload includes the step of:

calculating said load indicator(s) by means of measuring and/or estimating value(s) of at least one variable that holds information about the load of the production system relative to the maximum and/or minimum load. Said variable(s) includes: control valve or choke openings, liquid levels, pressures, temperatures, flow rates, densities, compressor rpm, and compressor power or derived measurements as a function thereof. The load indicator(s) is preferably automatically being kept non-positive and as close to zero as possible without restricting the production throughput more than necessary.

Preferably, the step of ramping up the throughput of the production system, or part(s) thereof, includes:

measuring or estimating the controlled variable(s), and
calculating the control means setting(s), such that the controlled variable(s) tracks at least one ramp-up curve for the controlled variable(s), as a function of time. Preferably, the step of calculating includes the steps of: calculating the control means setting(s) for each ramp-up curve and selecting the control means setting(s) associated with the least violation of ramp-up curve constraint(s) associated with the ramp-up curve(s). The step of calculating preferably further includes the step of:
redefining the controlled variable(s) and/or the ramp-up curve(s) such that decreasing the control means setting(s) results in decreased violation of the associated ramp-up curve constraint(s), and that the step of selecting is carried out by selecting the smallest control means setting. The step of ramping up is preferably carried out automatically and substantially continuously.

Preferably, the step of estimating the flow rate(s) is based on a mass balance and/or an energy balance and/or a momentum balance and/or an empirical relation(s) associated with the production system, or part(s) thereof, using historical- and/or on-line value(s) of measurement(s) and/or estimate(s). The step of estimating is preferably based on at least a dynamic mass balance, and the empirical relation(s) preferably provides information about the relationship between the measurement(s) and/or estimate(s) and the estimated flow rate(s).

The present invention also relates to a control system for carrying out the inventive method, and a computer program product for executing one or more steps of the inventive method, as well as a computer readable medium containing said computer program product.

Further advantages as well as advantageous features of the invention will appear from the following description.

BRIEF DESCRIPTION OF THE DRAWINGS

Preferred embodiments or modes of the invention cited as examples will now be described in detail with reference to the appended drawings, in which.

DETAILED DESCRIPTION OF PREFERRED EMBODIMENTS OR MODES OF THE INVENTION

Figure 1:
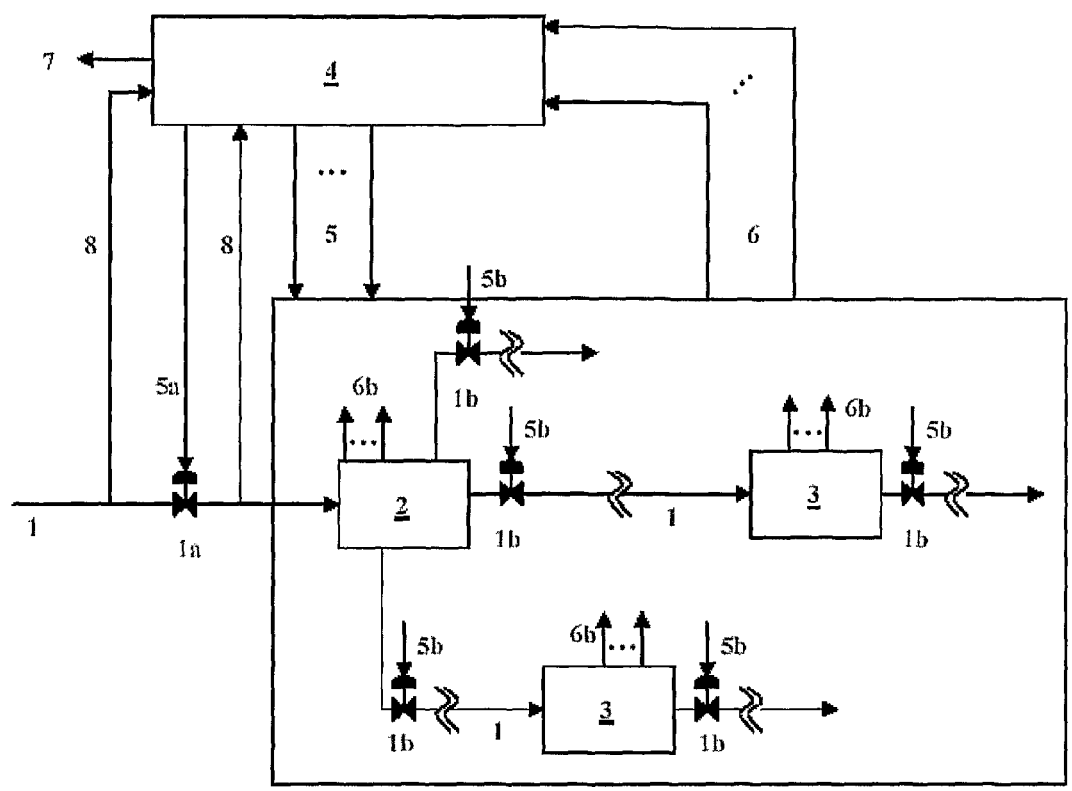
FIG. 1 shows a general production system to which the inventive method may be applied.

FIG. 1 shows a general production system including a processing facility to which the present invention may be applied. The system comprises one or several flow lines 1 with associated outlet valves 1a, 1b, one or more receiving processing units 2, one or more processing units 3, and an automatic feedback control system 4, wherein one or more receiving processing units 2 and one or more downstream processing units 3 with associated pipes 1 and equipment represent the processing facility.

The term flow lines include multiphase and single-phase pipelines, risers, wells or pipes connecting processing units and equipment.

The term processing units include one or more buffer tanks, vessels or drums, such as two or three phase separators, coalescers, slug catchers, compressors, degassers, inline degassers, inline deliquidisers, distillation columns, pumps, scrubbers, TEG contactors or heat exchangers.

The term control means is to be understood as any device or control signal(s) that can be used to influence, directly or indirectly, the variable(s) to be controlled. Typical control means include chokes, control valves, on/off valves, pump speeds, compressor speeds, choke or control valve opening set points, flow controller set points, pump speed set points, and compressor speed set points. By control means settings it is meant the values of the associated set points.

For example, if there is no flow line outlet valve 1a, in the production system of FIG. 1 some other control means for controlling the flow line outlet flow must be present. Such control means may include pump speed set points or pressure set points of the receiving processing unit(s).

In FIG. 1, signals 6 represent all measurements of variables associated with the receiving processing unit(s) 2 and the processing unit(s) 3. The measurement signals of variables associated with each of said unit(s) 2, 3 are denoted by 6b. Signals 8 represent measurements of variables associated with the outlet of the flow line 1. These measurements may be located upstream and/or downstream the outlet valve 1a. The output control signals from the control system 4 are denoted by reference numeral 5 (5b) and 5a. 5a denotes the signal, or outlet valve opening set point, to the outlet valve 1a, whilst 5 (5b) denotes valve opening set points for all the valves 1b to which the control system 4 is connected. The output signal 7 denotes estimates of the flow rates entering the processing facility and/or estimates of flow rates between the processing units 2, 3 in the processing facility. These estimates can also be used internally in the feedback control system 4 depending on how many flow measurements are available in the signals 6 and 8. The measurement signals 6 and 8 are preferably provided continuously to the control system 4 such that the control system may continuously provide automatic feedback control of the valves 1a and 1b.

It is important to note that the invention is not restricted to:
1. using valve opening signals as means for controlling the flows
2. any particular control means being available
3. any particular number of control means as long as there exists at least one In order to simplify the description and to focus on the invention as such rather than the multitude of production systems it may be applied to, it has been chosen in the following description to use valve opening set point signals as representation of the generic term control means.

Figure 2:
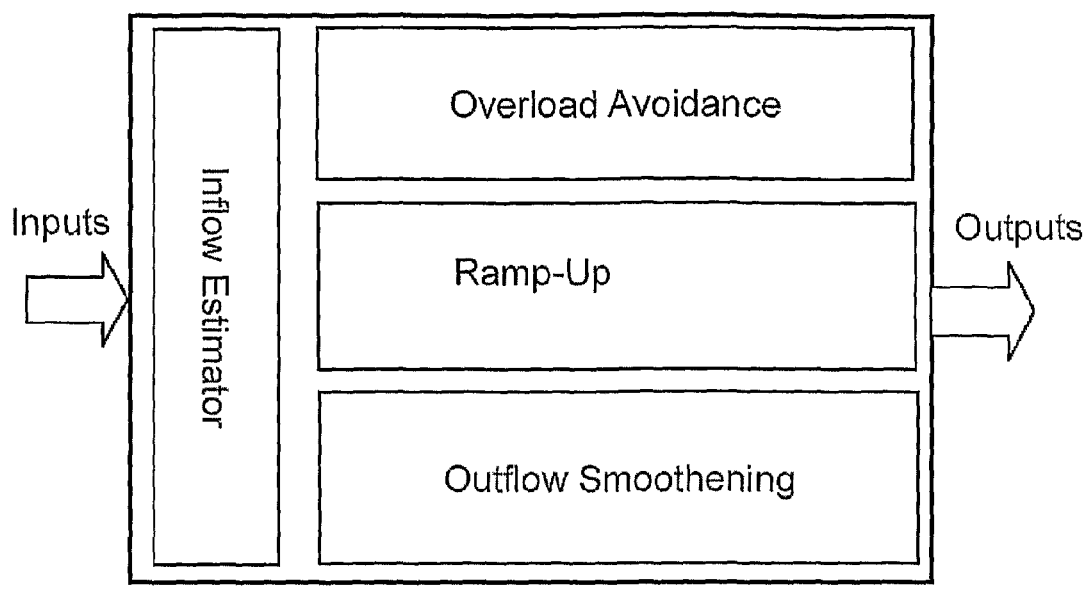
FIG. 2 shows an overview of the main internal functional modules consisting of one estimator module and three control modules of the inventive method.

FIG. 2 schematically shows the four main internal functional modules of the inventive method: Inflow Estimator, Overload Avoidance, Ramp-Up and Outflow Smoothening. The latter three modules are control modules and the former module is an estimator module. The control modules are performing automatic feedback control utilizing on-line measurements and/or estimates. The estimator module may utilize both on-line and/or historical measurements and/or estimates. These functional modules comprise algorithms. The algorithms may be based on dynamic and/or steady state components, such as PID controllers, dynamic and/or steady-state mass-, energy-, and momentum balances. The modules are flexible in that they may all be used integrated so as to co-operate or interact with each other in any combination comprising two or more of the modules, or be used separately, for maximizing production throughput and regularity in a production system. The functional modules are described in more detail below.

Outflow Smoothening Module

The so-called Outflow Smoothening module comprises three core control functionalities that operate on different levels: A base level functionality, a first sub-module, focuses typically on local basic pressure-, level-, and flow control associated with a buffer tank, or a buffer volume which may consist of several buffer tanks and/or volumes of flow lines or other processing equipment, by using techniques for compensation of nonlinearities (such as linearization) and gain-scheduling. An intermediate level functionality, a second sub-module, decouples the controlled variables to avoid detrimental counteracting effects in the combined so-called feedback system consisting of the control system with its algorithms according to the present invention, and the production system itself. In addition it may provide compensation for possibly varying process gain due to vessel geometry. A top level functionality, a third sub-module, typically calculates and coordinates flow set points associated with the base level, the first sub-module, such that the available buffer volume capacity in the total production system (typically consisting of available volumes in several buffer tanks and/or volumes of flow lines or other processing equipment) is optimally utilized whilst ensuring sufficient controllability. That is, ensuring that one is able to achieve acceptable control performance at the current operating point for all expected disturbances.

The above described partitioning of the Outflow Smoothening Module into three sub modules operating on different levels is to be understood as an example. The main reason for this partitioning is to simplify the presentation.

First Sub-Module

Figure 3:
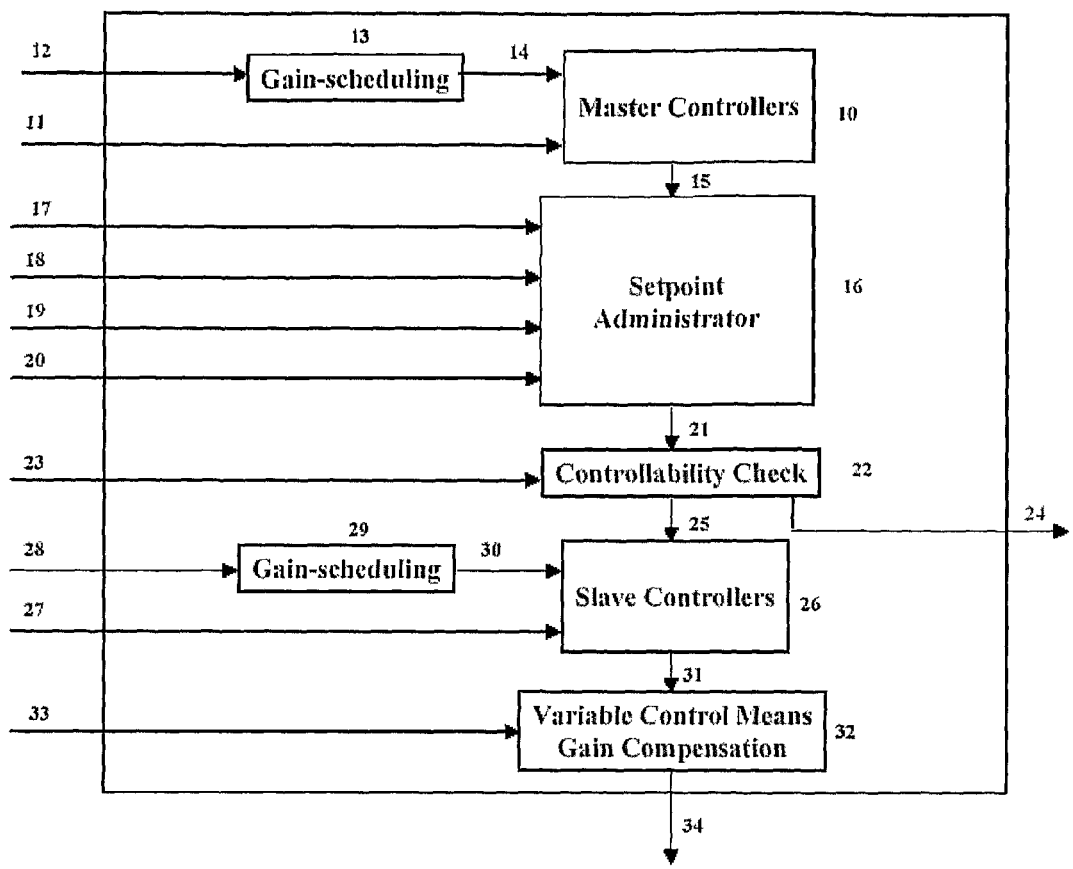
FIG. 3 shows a detailed example of the base level functionality of the Outflow Smoothening module.

A base level functionality, first sub-module, in the Outflow Smoothening module is shown in more detail in FIG. 3 by way of example. This sub-module includes so-called Master Controllers 10 that use measurement signals 11 of, typically, pressures and interface levels. The Master Controllers 10 are feedback controllers including anti-windup protection. Examples of feedback controllers include PID (Proportional+Integral+Derivative) controllers. Signal 12 consists of the scheduling variables and is input to a Gain-scheduling functionality 13. Examples of scheduling variables are measurements of gas pressure and liquid levels (in this case signal 12 is equal to signal 11), or the control errors associated with control of gas pressure and liquid levels. The Gain-scheduling functionality computes new controller parameters 14 for the Master Controllers 10 based on the values 12 of the scheduling variables. This enables the controller to react differently based upon the present situation. A typical example illustrating the need of this is level control in a vessel. The level controller should typically react slowly when operating around the level set point in order to be able to dampen, smooth or mitigate the liquid flow variations out of the vessel. However, if the current level is approaching the high or low level trip values, the controller should react more quickly. This means that the controller should be able to automatically adjust its gain depending on the vessel's current liquid level.

An output signal 15 from the Master Controllers 10 are set points for the outflows associated with the signals 11, that is, if the signals 11 consist of measurements of gas pressure and oil and water levels in a separator, the output signal 15 then typically consists of set points for gas-, oil-, and water flow out of the separator or associated control valve opening set points. The output signal 15 is sent to a set point Administrator 16. The set point Administrator 16 may receive the following set points which it processes: 1) set points for the outflows coming from the Master Controllers, indicated by the signal 15, 2) set points from the top level functionality which calculates outflow set points based on mitigation of outflow rate variations, indicated by signal 17, 3) set points from the Overload Avoidance module, indicated by signal 18, 4) set point corrections calculated by a Decoupling functionality (part of intermediate level functionality as described below), indicated by signal 19, and 5) set point corrections calculated by a functionality for compensation for vessel geometry (part of intermediate level functionality as described below), indicated by signal 20.

The set point Administrator 16 selects which set points to use based on the current situation. If the set points 17 are enabled, that is, the top level functionality is turned on, the Set point Administrator selects these set points. Otherwise, it selects the set points 15 given by the Master Controllers 10. However, if the Overload Avoidance module is turned on and at least one of the variables in signal 11 is above a high limit (pre-defined by the operator), the Set point Administrator selects the set points 18 coming from the Overload Avoidance module.

Signal 19 consists of outflow set point corrections calculated by the Decoupling functionality. These corrections are subtracted from the selected set points (signals 15, 17, or 18) by the Set point Administrator. The results are added to the set point corrections calculated by the functionality for compensation for variable process gain due to vessel geometry. The signal 20 consists of these set point corrections.

Final set points 21 are sent to Controllability Check functionality 22. Signal 23 consists of measurements of valve openings and the pressure drops across these valves (if available). The Controllability Check functionality 22 then checks whether the system to be controlled is able to reach the set points given by the signal 21. A typical example is if the set point for the oil outflow is higher than the current oil outflow, but the outlet oil valve is already fully open. This means that increasing this flow is impossible by just adjusting the opening of the valve. Such a situation is indicated by the Controllability Check functionality 22 through signal 24.

Outflow set points 25 are then sent to Slave Controllers 26. The Slave Controllers are typically PID controllers including anti-windup protection. The Slave Controllers use measurements or estimates of the outflow to be controlled, given by signal 27. Signal 28 consists of the scheduling variables and is input to Gain-scheduling functionality 29. Examples of scheduling variables are measurements or estimates of the outflows (in this case signal 28 is equal to signal 27), or the control errors associated with the outflows. The Gain-scheduling functionality 29 computes new controller parameters 30 for the Slave Controllers 26 based on signal values 28 of the scheduling variables.

Output signal 31 from the Slave Controllers 26 are set points for the outflow valve openings associated with the outflows 27 and measurements 11. These set points are sent to the Variable Control Means Gain Compensation functionality 32—the linearization functionality. This functionality calculates the control means gain $\Delta q/\Delta u$ based on historical and/or real-time measurements of variables provided by the signal 33, where q is the flow to be controlled and u is the output signal 34. Examples of measurements are pressure drop across the valve, current valve opening, densitometer readings, and flow rate.

Since the placement of the Decoupling functionality depends on the particular system to be controlled, see below, the description above only indicates a typical signal flow associated with the Decoupling functionality. However, the Decoupling functionality could also be transforming signals 11, 15 or 34.

EXAMPLES

Figure 4:
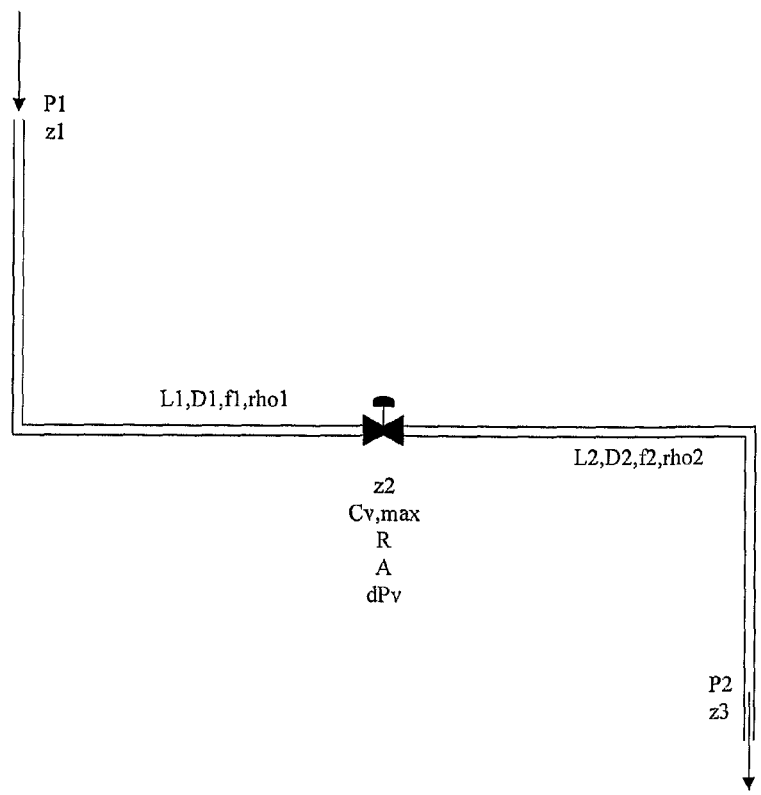
FIG. 4 shows a flow line with a valve and is used in an example for calculating a valve gain.

Consider the flow line shown in FIG. 4 and assume that the flow line carries liquid. The valve flow for the liquid valve is given by equation:

$$q = C_v(u)\sqrt{\frac{\Delta P_v}{g_s}} \quad (3)$$

where
- q is the volumetric flow through the valve [USGPM]
- $C_v(u)$ is the valve $C_v$ at u [USGPM/√Psi]
- $\Delta P_v$ is the pressure drop across the valve [Psi]
- $g_s$ is the specific gravity of the liquid upstream the valve (relative to water) [-]

Some common valve characteristics are:

$$C_v(u) = C_v^{max} R^{(\frac{u}{100}-1)},$$

equal percentage $$C_v^{max} \frac{u}{100},$$

linear $$C_v^{max} \sqrt{\frac{u}{100}},$$

quick opening $$C_v^{max}\left(R^{(\frac{u}{100}-1)}(1-a) + a\frac{u}{100}\right),$$

modified equal percentage where
- $C_v^{max}$ is the valve $C_v$ at u=100% [USGPM/√Psi]
- R is the valve rangeability
- a is the degree of modification from equal percentage to linear Define
- $z_1$ as datum of the flow line inlet [m]
- $P_1$ as pressure at the flow line inlet [Pa]
- $z_2$ as datum of the valve [m]
- $z_3$ as datum of the flow line outlet [m]
- $P_2$ as pressure at the flow line outlet [Pa]
- $k_{1,i}$ as minor loss coefficients upstream the valve [-]
- $k_{2,i}$ as minor loss coefficients downstream the valve [-]
- $n_i$ as number of restrictions/fittings and bends upstream (i=1) and downstream (i=2) the valve $$c_1 = \frac{14.5}{1e5}$$

as unit conversion $$\left[\frac{Psi}{Pa}\right]$$

$$c_2 = \frac{3.785}{10^3}\frac{1}{60}$$

as unit conversion [(m³/s)/USGPM]
- $f_1$ as the friction factor upstream the valve [-]
- $f_2$ as the friction factor downstream the valve [-]
- $A_1$ as the flow line cross sectional area upstream the valve [m²]
- $A_2$ as the flow line cross sectional area downstream the valve [m²]
- $\rho_1$ as the liquid density upstream the valve [kg/m³]
- $\rho_2$ as the liquid density downstream the valve [kg/m³]
- $L_1$ as the length of the flow line upstream the valve [m]
- $L_2$ as the length of the flow line downstream the valve [m]
- $D_1$ as the diameter of the flow line upstream the valve [m]
- $D_2$ as the diameter of the flow line downstream the valve [m]

and let $$R_p = \left[f_1 \frac{1}{2A_1^2}\rho_1\frac{L_1}{D_1} + f_2\frac{1}{2A_2^2}\left(\frac{\rho_1}{\rho_2}\right)^2\rho_2\frac{L_2}{D_2} + \sum_{i=1}^{n_1}k_{1,i}\rho_1\frac{1}{2A_1^2} + \sum_{i=1}^{n_2}k_{2,i}\rho_2\left(\frac{\rho_1}{\rho_2}\right)^2\frac{1}{2A_2^2}\right]c_2^2$$

$$\Delta P_p = P_1 - P_2$$

$$\Delta P_g = \rho_1 g(z_3 - z_2) + \rho_2 g(z_2 - z_1)$$

then $\Delta P_v = (\Delta P_p + \Delta P_g - q^2 R_p)c_1$. Now it can be shown that the liquid flow is given by equation:

$$q(u) = \sqrt{\frac{\frac{\Delta P_p + \Delta P_g}{g_s}c_1}{1 + c_1\frac{R_p}{g_s}C_v(u)^2}}\, C_v(u) \quad (4)$$

meaning that the valve gain is given by equation:

$$\frac{dq}{du} = \sqrt{\frac{\frac{\Delta P_p + \Delta P_g}{g_s}}{1 + c_1\frac{R_p}{g_s}C_v(u)^2}}\, \frac{dC_v(u)}{du} -$$

$$C_v(u)\sqrt{\frac{\Delta P_p + \Delta P_g}{g_s}c_1}\left(1 + c_1\frac{R_p}{g_s}C_v(u)^2\right)^{-\frac{3}{2}}c_1\frac{R_p}{g_s}C_v(u)\frac{dC_v(u)}{du}$$

$$= \left[\frac{q}{C_v(u)} - q\left(1 + c_1\frac{R_p}{g_s}C_v(u)^2\right)^{-1}c_1\frac{R_p}{g_s}C_v(u)\right]\frac{dC_v(u)}{du}$$

where $$\frac{dC_v(u)}{du} = C_v^{max}\frac{\ln R}{100}R^{\left(\frac{u}{100}-1\right)}$$

for an equal percentage valve $$\frac{dC_v(u)}{du} = \frac{C_v^{max}}{100}$$

for a linear valve $$\frac{dC_v(u)}{du} = C_v^{max}\left(\frac{\ln R}{100}R^{\left(\frac{u}{100}-1\right)}(1-a) + \frac{a}{100}\right)$$

for a modified equal percentage valve.

Alternatively, a simpler and rougher approach is to compensate for the valve characteristic. However, the valve characteristic is based on a constant pressure drop across the valve. This means that the installed valve characteristic will differ from the valve characteristic based on this constant pressure drop. However, consider again equation (3) and assume that the valve is equal percentage, that is $$C_v(u) = C_v^{max}R^{\left(\frac{u}{100}-1\right)}$$

To compensate (linearize) this valve characteristic, the following function can be introduced:

$$g(u) = \frac{1}{C_v^{max}}\left(\frac{\ln u}{\ln R} + 1\right)100 = \tilde{u}$$

where u is the original controller output (signal 31 in FIG. 3), and ũ is the modified controller output (signal 34 in FIG. 3), it can be seen that:

$$C_v(\tilde{u}) = \frac{C_v^{max}}{C_v^{max}} R^{\left(\frac{\ln u}{\ln R}\right)} = u$$

which is a linear function of u. In addition, the nonlinearity $\sqrt{\Delta P_v}$ can be cancelled by just dividing by $\sqrt{\Delta P_v}$ if measurements of the pressure drop are available. However, care must be taken if $\sqrt{\Delta P_v}$ is small.

Referring again to FIG. 3 the Variable Control Means Gain Compensation functionality 32 calculates the control means gain and scales the commanded valve opening set points 31 coming from the Slave Controllers 26 such that the Slave Controllers only "see" valves with constant unit gain.

Second Sub-Module

Figure 5:
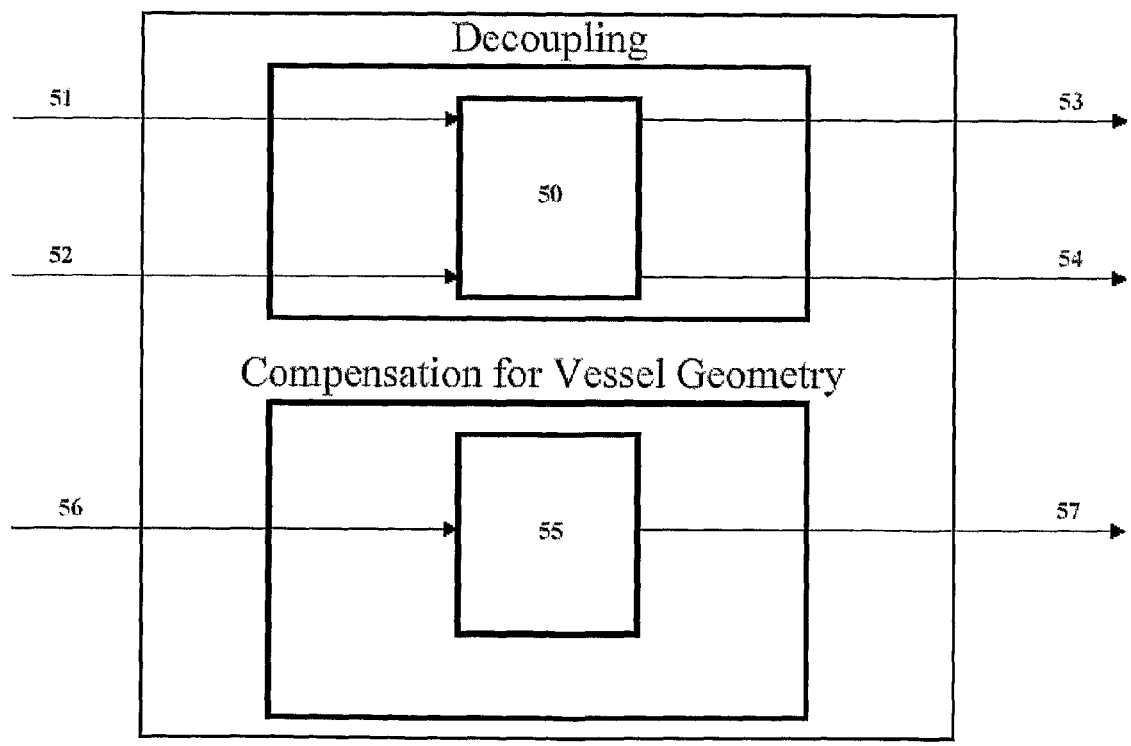
FIG. 5 shows an example of the intermediate level functionality in the Outflow Smoothening module of FIG. 3.
Figure 6:
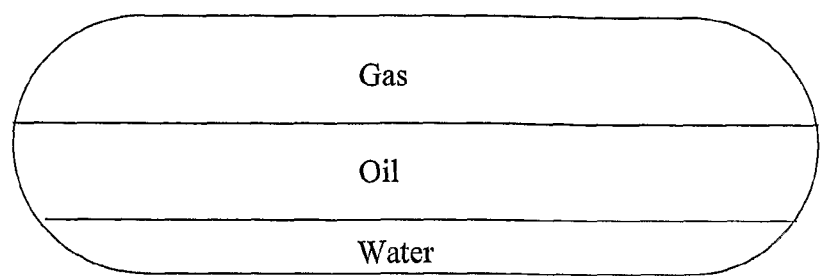
FIG. 6 shows a conceptual sketch of a three-phase oil/water/gas gravity-based separator.

In FIG. 5 the intermediate level functionality consists of decoupling and compensation for variable process gain due to vessel geometry. For example, in a three-phase separator for separation of oil/gas/water phases there will be couplings between all three phases. If the liquid level is changed, this will affect the gas pressure since the gas volume inside the vessel is changed. If the water level is changed, this will obviously change the oil level. If the gas pressure is changed, this will affect the oil outflow since the pressure upstream the outlet oil valve is changed. This again affects the oil level. The same is true for the gas pressure and water level. Such couplings are cancelled out by the Decoupling functionality 50. The Decoupling functionality 50 includes some methods from control theory which includes dynamic nonlinear decoupling, see for example "Nonlinear Control Systems", second edition, by Alberto Isidori, Springer Verlag, ISBN 0-387-50601-2 or "Multivariable Feedback Control", second edition, by Sigurd Skogestad and Ian Postlethwaite, Wiley, ISBN-13 978-0-470-01167-6. The purpose of the Decoupling functionality 50 is to make the system to be controlled including the Decoupling functionality diagonal. By a diagonal system it is meant a system where each control means affects one, and only one, controlled variable. This means that one can design the controller based on a single-input single-output controller design strategy. The placement of the Decoupling functionality 50 in FIG. 5 in the signal flow of FIG. 3 depends on the particular system to be controlled. Typical input signals 51 and 52 to the Decoupling functionality 50 in FIG. 5 are outputs from the Master Controller or Slave Controllers, set points to the Master Controller, and flow-, pressure- and level measurements. Typical output signals 53 and 54 from the Decoupling functionality 50 are flow set point corrections or valve opening set point corrections.

Compensation for varying process gain 55 from net outflow to oil and/or water level and/or gas pressure due to the vessel geometry is carried out by providing information about the ratio 57 of rate-of-change of oil level to unit change in net oil outflow as a function of oil level 56, and similarly for the water level 56 and gas pressure 56. For the gas pressure the mentioned ratio is typically a function of gas volume 56 and temperature 56.

Third Sub-Module

This top level functionality calculates and coordinates flow set points given to the set point Administrator 16 in the base level functionality (see FIG. 3). However, it is emphasized that it is not necessary to have flow controller(s) at the base level. This top level functionality can also calculate valve opening set points instead of flow set points. In the following it is assumed that there are flow controllers as described above at the base level such that nonlinearities, variable process gains, and unwanted couplings (or, interactions) between control means and controlled variables are compensated for outside this top level functionality. However, the top level functionality may also include a functionality for handling nonlinearities, variable process gains, and interactions.

The third sub module uses automatic feedback control to mitigate the outflow variations of oil-, water-, and gas downstream a buffer tank or downstream a system comprising several buffer tanks or other equipment with buffer volume (as for example a separator train). The reasons for this include:
- less flow variations implies less chance of tripping the downstream equipment
- less flow variation implies less equipment wear and less downtime due to maintenance
- it is typically easier to fulfill the quality requirements on the oil, water, and gas if the variations in the flow rates are kept to a minimum.

Utilizing the buffer volume of processing unit(s)/equipment and/or flow line(s) implies that liquid level(s) and pressures) are varying, thus prioritizing less fluctuation in the flow rates out of the buffer volume. How much level(s) and pressures) should be allowed to vary has to be based on a trade-off between:
- the potential increase in production
- the quality reduction in the product taken out of the vessel due to variations in the levels and pressure
- the quality improvement due to more stable feed to the downstream equipment
- the reduced equipment wear.

As an example, the top level functionality uses measurements of gas pressure and liquid levels and the outputs are set points for the gas, oil, and water outflows and the inflow (three-phase separator). The operator may specify upper and lower limits for the gas pressure and liquid levels in the associated buffer tank(s). In addition, signal 24 in FIG. 3, which indicates the degree of controllability of the system, is used as input to this top level functionality such that the outflow and/or the inflow set points are adjusted if controllability is poor. The inventive method calculates flow rate set points or valve opening set points for the buffer tank(s) outlet and/or inlet that minimize the outflow variations given the constraints of keeping the pressures/levels within their specified bands and ensuring controllability. How much the outflow variations can be smoothened is dependent on how much the pressures and levels are allowed to vary.

The flow rate set points or valve opening set points are calculated using a supervisory algorithm that minimizes outflow rate variations given the constraints that the gas pressure(s) and/or liquid levels should be kept between their respective high and low limits and by keeping the inlet (feed) valve openings to the processing facility as high as possible. This supervisory algorithm can be based on a Model Predictive Control (MPC) algorithm or a set of PID controllers with associated coordinating logic.

Overload Avoidance Module

The Overload Avoidance module (see FIG. 2) will, if necessary, override all the other described functionalities in order to protect the production system from being overloaded.

The Overload Avoidance module calculates settings, i.e. values of set points, for the control means based on a determination of at least one load indicator, while it compensates for is nonlinearities of the control means. This ensures that the production throughput is not restricted more than necessary to avoid that the production system or part(s) thereof is being overloaded.

A basis for the Overload Avoidance module is that one or more measurements or estimates are available which determine the value(s) of a variable(s) that holds information about the load of the production system relative to the maximum (minimum) load. Such a variable(s) is called a load indicator(s). Examples of measurements are control valve or choke openings, liquid levels, pressures, temperatures, flow rates, densities, compressor rpm, and compressor power or derived measurements as a function thereof. A person skilled in the art will be able to determine other suitable measurements and associated load indicators in each instance.

The aim of the control algorithm in the Overload Avoidance module that manipulates the control means is to keep the load indicator(s) non-positive and as close to zero as possible. The control algorithm uses feedback from the load indicators and adjusts (increases/decreases) the control means, such as control valve- or choke opening set points, so that the production system operates at, or as close as possible to, its maximum load.

For example, if the liquid level in one buffer tank approaches a critical high value, the inventive control method will first check load indicator(s) downstream of the buffer tank to see if there is any available buffer capacity there. If so, the Overload Avoidance module will increase the liquid outflow of the buffer tank by increasing the liquid outflow set point sent to the Set point Administrator (signal 18 in FIG. 3) or increasing the liquid outflow valve opening. If this is not possible—the outflow liquid valve may already be fully open or part of the production system downstream of the buffer tank may already be fully loaded—the Overload Avoidance module will decrease the liquid inflow to the buffer tank by decreasing the liquid inflow set point or the liquid inflow valve opening.

Referring again to FIG. 1. The Overload Avoidance module uses measurements of variables (signal 6) associated with the processing units and equipment in the processing facility. The module makes use of the valve 1a or valve(s) 1b, or other means for controlling the flows. Through a control algorithm, resulting control signals 5a and 5 (5b) are sent to the valves 1a and 1b, and the module deals directly with the problem of keeping the production system below or at its maximum load in instances where the feed rate into the receiving processing unit(s) or into processing unit(s) within the processing facility potentially becomes temporarily too high.

The control algorithm for keeping the load indicator below or at zero can be of any form, including a PID controller. However, it is necessary that the chosen load indicator is the one that is influenced by adjusting the buffer tank control means, such as control valves. In order to assure that the Overload Avoidance module is not causing an unnecessary restriction of the production system throughput, the algorithm of this module should have integral action in some form. This will continuously force the valve(s) to open when possible, that is, when the load indicators are below zero. Since gain-scheduling and compensation for variable control means gain, such as control valve gain, are included, the system can perform closer to optimality, that is, it enables reducing the average valve openings less than otherwise would be the case and by that enables increased throughput.

Figure 7:
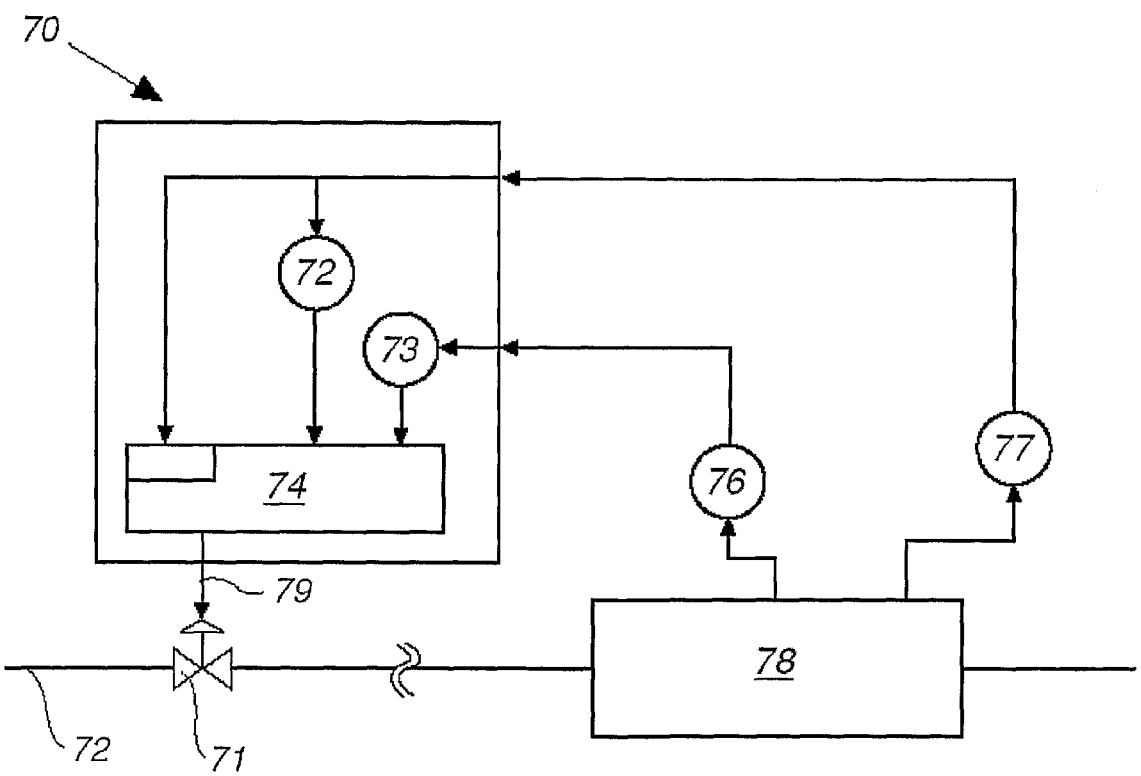
FIG. 7 schematically shows an embodiment of an automatic feedback control system in which a so-called Overload Avoidance module is used according to the present invention.

FIG. 7 illustrates a further embodiment of an automatic feedback control system 70 to which the Overload Avoidance module is applied and where the flow line outlet valve 71 can be adjusted by this module. In this embodiment the control system 70 includes two sub-control units 72, 73, and a selector 74. The control system 70 is shown to receive at least a first measurement signal 77 of at least a first variable as well as at least a second measurement signal 76 of at least a second variable from a downstream processing facility 78. The first measurement signal 77 is sent to a first sub-control unit 72.

The sub-control unit 72 then uses a specific algorithm to calculate a valve 71 opening value. The second measurement signal 76 is sent to a second sub-control unit 73. This second sub-control unit 73 compares the measured value 76 of a variable with a pre-determined limit. The sub-controller 73 then uses a specific algorithm to calculate a valve 71 opening value. In the selector 74—depending on the value of the signal 77 (see below)—either the smallest one of the two valve openings is chosen, or the valve opening computed by sub-controller 72 is used. The output signal 79 from the control system 70 is sent to control the operation of the valve 71 at a flow line 72 outlet.

In this embodiment a first measurement can be used as a means of activating control of the buffer tanks' outflow and/or the inflow to the processing facility and/or one or more of its processing units based on a second measurement. In some cases, when the first variable has reached its predetermined limit, measurement of this variable will not be useful/appropriate for adjusting the buffer tanks' outflow or inflow by outlet valve 71 to avoid overload. In order to control the outflow/inflow, a second measurement of a different second variable, which gives an accurate indication of the load, is needed. For example, the first measurement/variable could be the opening of a valve that controls the coolant flow in a cooler, whilst the second measurement/variable could be the temperature of the flow that is cooled.

If two measurements are needed for obtaining adequate control of the inflow to the processing facility or one or more of its processing units, the algorithm of the Overload Avoidance module may encompass calculation steps wherein the pre-determined limit is subtracted from the first measurement to obtain a load indicator. Based on the load indicator a first valve opening is calculated. Based on the second measurement of the second variable and a set point for this variable, a second valve opening is then calculated. If the load indicator is positive, the minimum of the two valve opening values is chosen, otherwise the first valve opening value is chosen. The selected valve opening is then implemented by sending the selected valve opening control signal to the valve. In order to achieve a quick response to an increase in the inflow, the is algorithm for calculating the second valve opening should preferably allow the proportional and derivative action to only close the valve.

It shall be appreciated that the invention can be used for avoiding overload of a plurality of processing units and equipment in the downstream processing facility. Thus, in an embodiment of the present invention, several control systems are combined to control the valve, see below. This may be especially suitable in processing facilities where the capacity problems due to high inflow rates of gas or liquid from the flow line at hand may appear at more than one location in the processing facility.

Figure 8:
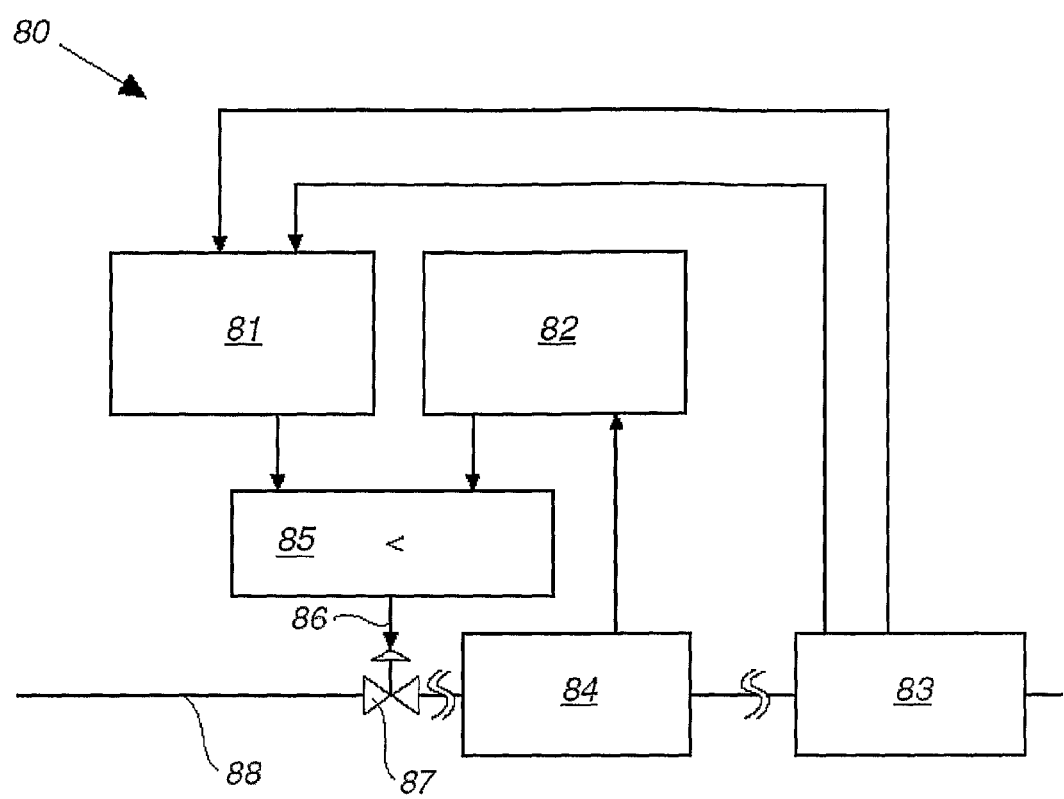
FIG. 8 schematically shows another embodiment of an automatic feedback control system in which the Overload Avoidance module is used according to the present invention.

FIG. 8 shows another embodiment of an automatic feedback control system 80 comprising the Overload Avoidance module in a special case where at least two control units are used. There are cases when two or more processing units can reach their maximum load during high gas or liquid flow rates from the flow line at hand. In such cases it is suitable to apply several control units and select the lowest calculated controller output, see FIG. 8. An example of such a situation is when the high liquid rate and the high gas rate cause problems in different parts of the processing facility. This will be especially useful if a processing capacity limit can be reached for more than one downstream processing unit during high flow rates out of the flow line in question. This is illustrated in FIG. 8 with two control units 81 and 82, where a first control unit 81 is shown to receive at least two first input signals from a downstream processing unit 83 and a second control unit 82 is shown to receive at least a second single input signal from a further downstream processing unit 84. The control system further includes a selector 85, which again chooses the lowest value of the output signals from the two control units, when sending an output signal 86 to control the valve opening of a valve 87 at a flow line 88 outlet.

Detailed examples of embodiments of the Overload Avoidance module with the Outflow Smoothening Module will now be described with reference to FIG. 9 to 12. The embodiments relate to mitigation of slugging caused by pigging operations.

Figure 9:
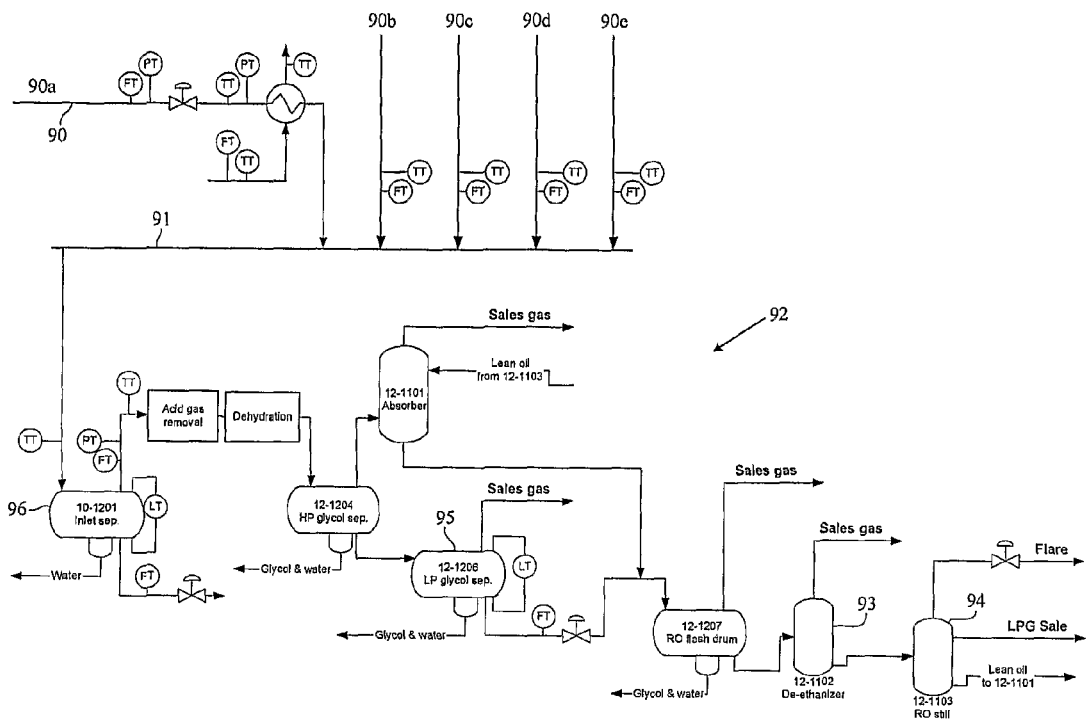
FIG. 9 shows an exemplifying production system, which includes a supplier and a processing facility, to which the present invention may be applied.

FIG. 9 shows a supplier and processing facility wherein gas and condensate is provided by several suppliers 90a to 90e via a common flow line 91. The processing equipment of the downstream LPG (Liquefied Petroleum Gas) processing facility 92 may comprise various components, such as separators, heat exchangers, absorbers, and so on. The type and nature of these components as such does not form a part of the present invention, and these are thus not explained in any detail.

A de-ethanizer unit 93 is considered to form the main bottleneck of the processing facility 92 during slug reception from supplier 90 in the flow line 91. A problem has been that the feed to the de-ethanizer 93 often exceeds its capacity (~1500 m3/d in the example as shown in FIG. 9). The de-ethanizer 93 then cannot separate sufficiently of the components ethane (C1) and methane (C2) from its feed stream. As a result too much C1 and C2 carry over to the downstream rich oil still (RO still) 94, causing so-called black-smoke flaring which must be avoided due to environmental concerns. This problem has been addressed by controlling an upstream receiving processing unit, a LP (Low Pressure) glycol separator unit 95, such that the flow into the de-ethanizer 93 is below its maximum capacity provided that the liquid level of the glycol separator 95 is below its high limit. This control strategy does, however, introduce seemingly unnecessarily high variations of the inflow to the de-ethanizer 93 and/or other downstream process equipment of the processing facility 92.

The slugging may even require that the pipeline 90 from the supplier plants (not shown for clarity) to be shut in due to too high a liquid level in the inlet separator unit 96 of the downstream processing facility 92. Further, due to the load increase during slug reception, carry over of liquids to compressor units (not shown) has occurred, which may severely damage these units.

The pipeline 90 from the supplier plant may be of substantial length, such as over 100 km long. The pipeline may need to be pigged daily starting from the supplier plant to the processing facility 92. This means that a liquid slug has to be handled each day by the processing facility 92. The associated pressure and flow variations may cause problems for both the slug-receiving processing facility 92 and for the producer(s) supplying the pipeline 90.

The inflow from supplier line 90 to the processing facility 92 during pigging may sometimes be larger than the set point of a flow controller for the flow out of the glycol separator 95. The set point for the flow out of the separator 95 may equal the capacity of the de-ethanizer 93. This may lead to a situation where a high-level protection feature of a level controller of the separator 95 kicks in and the load to the de-ethanizer 93 exceeds its capacity. The interaction between the level- and flow controllers may thus cause highly varying outflow from the separator 95 that subsequently ripples through the de-ethanizer 93 and the rich oil still 94. This is due to kicking in of the flow controller. The flow controller may have a set point which is very different from the outflow decided by the level controller.

The pigging may thus upset the supplier pipeline 90 (high back pressure) and the processing facility 92 (high liquid flow rates). The following describes, with reference also to FIG. 10 and FIG. 11, how the present invention can be used to handle the liquid slug in front of a pig, and to allow a reduction in pigging frequency.

Figure 10:
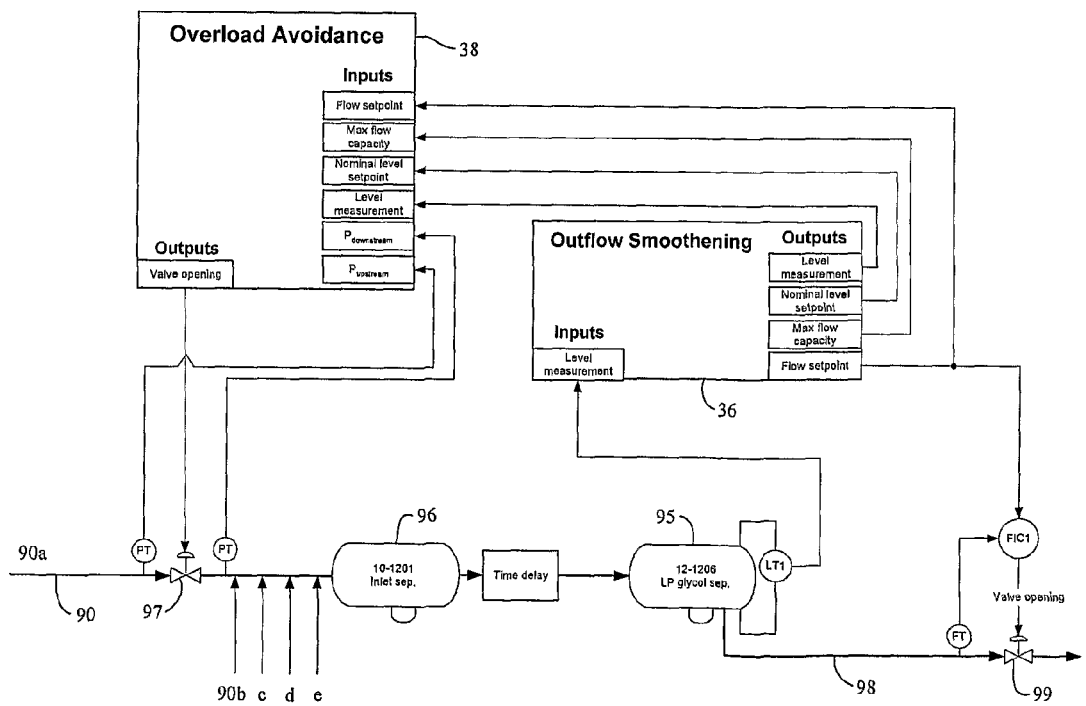
FIG. 10 shows an embodiment of an automatic feedback control system structure for the supplier and processing facility of FIG. 9 focusing on overload avoidance with outflow smoothening.

An overview of the control structure is shown in FIG. 10. In the shown embodiment the flow in slugging pipelines is controlled by means of automatic (or active) feedback valve control provided by Outflow Smoothening control module 36 and overload Avoidance control module 38. By means of the automatic feedback control a more robust and smooth mitigation of slugs from the pipeline 90 is provided, and the pigging frequency can be reduced.

The Outflow Smoothening module 36 has a cascade structure with a flow control loop (slave) in cascade with a level control loop (master).

In addition, the inlet valve 97 opening is automatically controlled based on feedback from the condensate outflow set point of the glycol separator 95 from the master as well as liquid level measurements of the separator 95 instead of manually avoiding de-ethanizer unit 93 (see FIG. 9) overload by changing the set point of the processing facility inlet flow controller which is using feedback from the highly inaccurate inflow measurement, as in the prior art. This is accomplished by using the Overload Avoidance module 38.

If the Outflow Smoothening module 36 commands an outflow that is equal to or above the processing capacity of the downstream de-ethanizer 93 and the level in the glycol separator 95 is still increasing, then the inflow from the pipeline 90 has to be decreased by reducing the valve opening of the inlet valve 97. At the same time it is desired to have the inlet valve 97 to be open as much as possible. This is taken care of by the control module 38 that controls the inlet valve 97 using feedback from the condensate outflow set point of the glycol separator 95. This set point equals the maximum capacity of the de-ethanizer 93.

In addition, a high level protection controller may be provided as part of the Outflow Smoothening module. It kicks in if the level in the glycol separator 95 reaches above a given limit.

Figure 11:
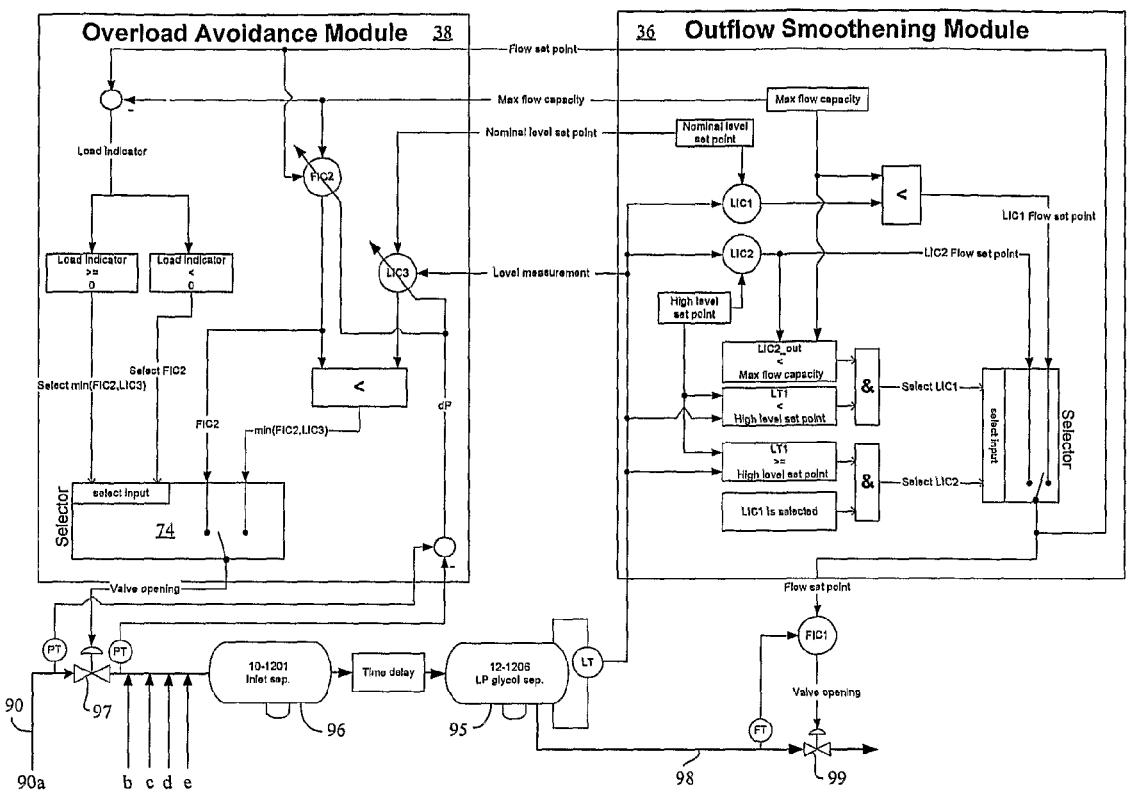
FIG. 11 shows in more detail the control system structure of FIG. 10.

FIG. 11 shows in more detail the FIG. 10 control structure. From the various components shown therein, a level controller LIC1 is provided for controlling the level of the glycol separator 95. The purpose of this controller is to keep the flow rate to the de-ethanizer 93 (in FIG. 9) fairly steady under normal, non-slugging, conditions. This may be a loosely tuned level controller which normally controls the level alone, i.e. when the flow out of the supplier pipelines or the processing facility's inflow is not slugging too heavily. The maximum allowed output from this level controller LIC1 (or flow set point to the flow controller FIC1) equals the given maximum flow capacity of the de-ethanizer 93.

LIC2 is a tightly tuned over-ride level controller for the separator 95. LIC2 kicks in when the level in the separator 95 increases above a certain limit. If a level limit of 75% is assumed, the set point of this controller is 75% and its purpose is to quickly "catch" the level so as to avoid trips due to high liquid level in the separator 95. When LIC2 kicks in it starts out at whatever the output of LIC1 was at the moment the level passed 75%. The output of LIC1 then tracks the output of LIC2 until the level is below 75% and the output from LIC2 is below or equal to the maximum capacity of de-ethanizer 93.

LIC1 picks up the output where LIC2 left it. This type of operation is to ensure bumpless transfer between these two controllers, and to avoid integrator wind-up problems.

The inlet valve 97 is controlled by means of level controller LIC3, which is a modified derivative plus PI controller of the level in the glycol separator 95 with set point equal to the nominal level set point. It kicks in if the flow set point is at or above the maximum capacity of de-ethanizer 93. The derivative action may only be allowed to contribute to reducing the opening of the inlet valve 97, and its purpose is to quickly close the inlet valve if the level in the glycol separator 95 is increasing rapidly while the flow set point is equal to the maximum capacity. Ideally, it should be quick enough so that the high-level over-ride controller of the separator 95 does not need to kick in. The purpose of the PI part of the level controller LIC3 is to help bringing the fluid level in the separator 95 back to its nominal level set point. To compensate for the changing gain, or nonlinearity, when the pressure drop across the valve 97 changes, the gain of this controller is scheduled based on this pressure drop.

The flow controller FIC1 is controlling the outflow from the glycol separator 95 via flow line 98 by means of a control valve 99. FIC1 may comprise a tightly tuned flow controller, and is in cascade with the level controllers LIC1 and LIC2.

FIC2 is another flow controller component for controlling the inlet valve 97. The set point of this flow controller is the maximum processing capacity of the de-ethanizer 93 in FIG. 9. The purpose of this flow controller is to open the inlet valve 97 when the slug has passed through. This is characterized by that the outflow set point for the glycol separator 95 drops below the maximum capacity. To compensate for the changing gain, or nonlinearity, when the pressure drop across the valve 97 changes, the gain of this controller is also scheduled based on the pressure drop. The level controller LIC3 is only activated if the flow set point is above or equal to the maximum capacity of de-ethanizer 93, and in this case the selector 74 chooses a valve opening that is equal to the minimum of the output of the controllers FIC2 and LIC3. Both FIC2 and LIC3 track this minimum. If the flow set point is below the maximum capacity of de-ethanizer 93, FIC2 is chosen by the selector 74 and LIC3 tracks the output of FIC2.

Figure 12:
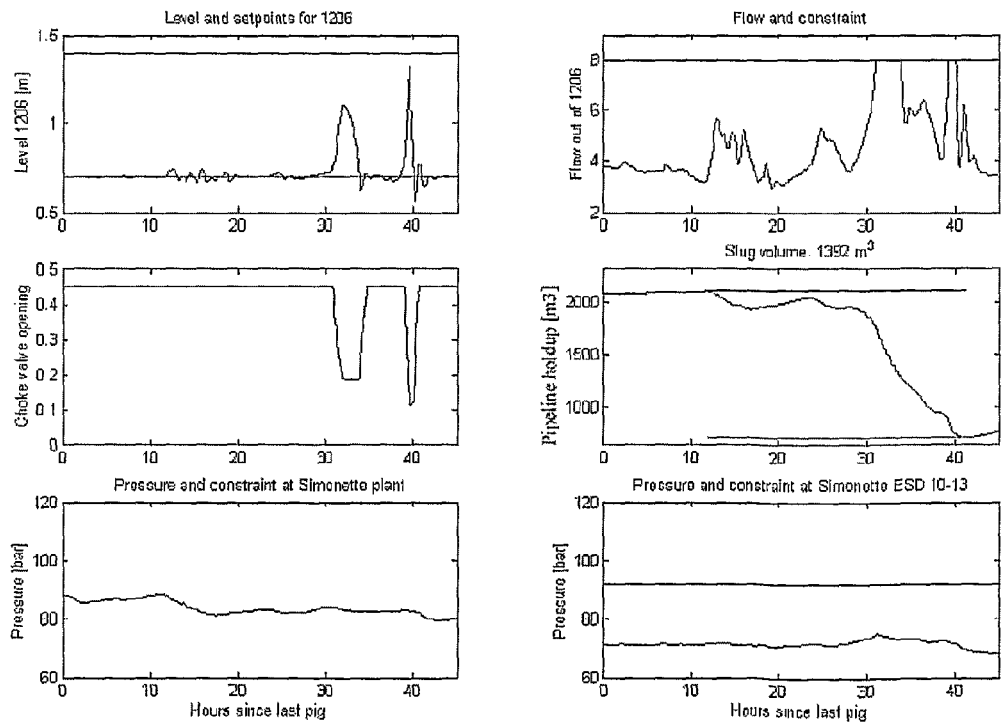
FIG. 12 shows simulation results obtained for the control of the system in FIG. 9 by the use of the present invention.

The performance of the above-described control system has been tested by simulation. Some of the results are shown in the diagrams of FIG. 12 illustrating the values of various variables as a function of hours since the last pigging operation. The upper left diagram shows the fluid level in the glycol separator 95. The upper right diagram shows the trend of the flow out from the separator 95 and thus into the de-ethanizer 93. The middle left diagram shows how the opening of the inlet valve 97 is adjusted. The middle right diagram shows inlet pipeline 90 holdup. The lower left diagram shows the pressure and constraint at the plant supplying the inlet pipeline 90, and the lower right diagram shows the pressure and constraint at the producer plant.

Simulations of the system have been performed, with and without automatic feedback control of the inlet valve 97 to the processing facility 92. The study demonstrated that automatic control of the inlet valve 97 provides acceptable operating conditions both for the processing facility 92 and the producers into pipeline 90 during pigging.

The presented results were achieved with automatic valve 97 control using the Overload Avoidance control module 38 combined with the Outflow Smoothening control module 36 for the LP glycol separator 95.

Based on the simulation results, it is expected that flaring in the processing facility is reduced, pigging frequency can be reduced, and that pressure variations in the pipeline(s) from the producer(s) are reduced.

When reducing the pigging rate e.g. to once every 14 days, the flow rate—associated with the slugging during pigging or terrain induced slugging due to low production rates—to the de-ethanizer 93 can be kept stable and below 1500 m$^3$/d while avoiding too high levels in the inlet separator 96 and glycol separator 95.

In the following the Ramp-Up module and the Inflow Estimator module as schematically shown in FIG. 2 will be described in more detail.

Ramp-Up Module

The Ramp-Up module automatically ramps up the production, or throughput, of an oil and gas production system, or part(s) thereof, by tracking ramp-up curve(s) consisting of flow rate set point(s) and/or pressure set point(s). This includes compensation for nonlinearities of the control means.

The Ramp-Up module is designed to enable automatic start up of a flow line or a well as quickly and efficiently as possible while ensuring that the production follows a ramp-up curve. The ramp-up curve may be predefined. For example, this ramp-up curve may describe variables such as set points for flow line outlet liquid or gas flow rates, or set point for bottom-hole pressure in a well as a function of time. The Ramp-Up module uses automatic feedback control that uses measurements or estimates of the ramp-up variable to manipulate so as to automatically control the opening of a control means, such as a production choke, so that the ramp-up variable (for example the outlet liquid flow) follows the ramp-up curve.

For example, an operator may define a constraint on the maximum rate-of-change of liquid rate out of the flow line that the production system can handle. If a multiphase meter is installed at the flow line outlet, the Ramp-Up module will make use of the liquid rate measurements from the multiphase flow meter and automatically ramp up the production according to the maximum allowed rate-of-change in the liquid rate. If a multiphase flow meter is not available estimates of liquid flow rates may be obtained from the Inflow Estimator module.

Figure 13:
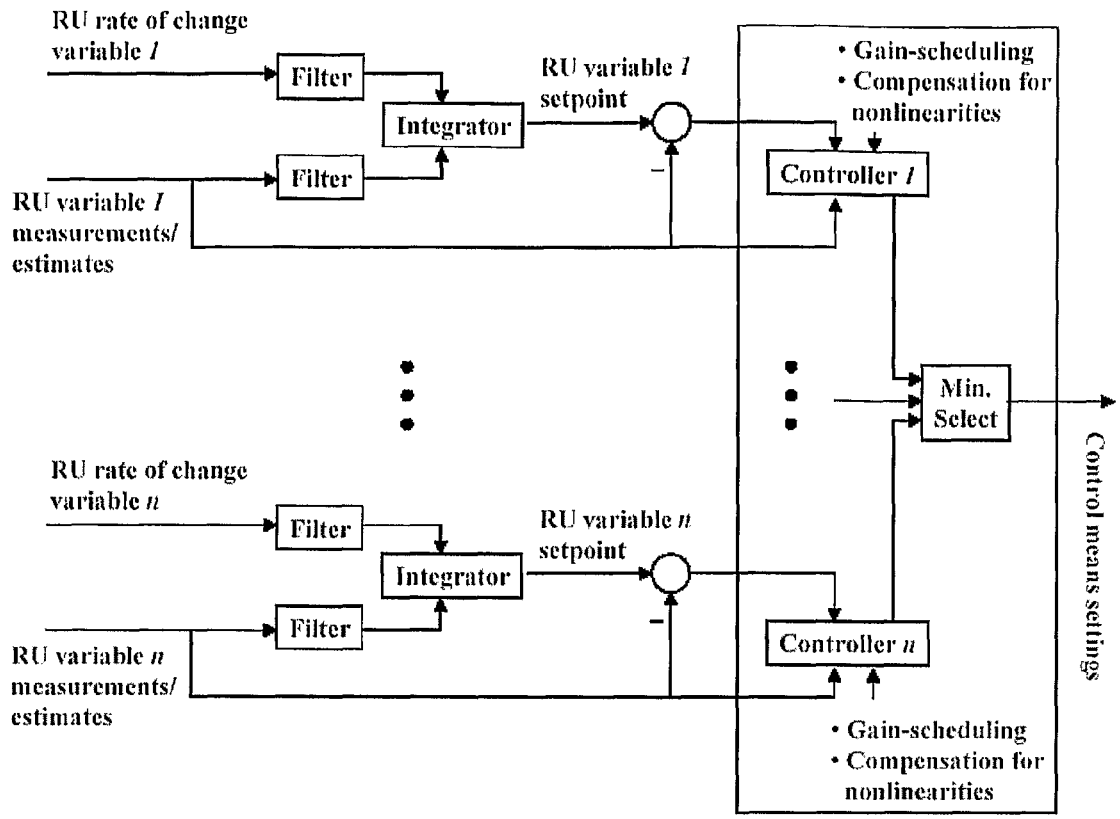
FIG. 13 shows an embodiment of a so-called Ramp-Up module.

Generally, the Ramp-Up module is configured to handle not only one ramp-up curve constraint, but several. In this case one can always define the ramp-up variables such that a decrease in the control means settings results in less violation of the ramp-up curve constraints. Thus, if more than one ramp-up curve is to be handled, the Ramp-Up module may choose the smallest (cf. Min Select in FIG. 13) control means setting, such as the production choke opening, so that every ramp-up curve is being tracked as close as possible in the sense that the associated ramp-up curve constraint(s) are violated as little as possible. An example of using different ramp-up curve constraints is if there are limitations on both gas and liquid processing capacity during start-up. FIG. 13 shows a block-diagram of a Ramp-Up module. Integrators may be included for preferably continuous calculation of the ramp-up set point(s). This is based on a filtered given rate-of-change for each variable to be controlled by the Ramp-Up module, and a filtered measurement or estimate of the current value of the variable. The controllers have functionality for gain-scheduling and compensation for non-linearities of the control means, such as valve gain, as all the controllers of the control systems as described herein. Also, standard functionality for avoiding wind-up of the integrators in controllers 1-$n$ by tracking of the output from the selector (Min Select in FIG. 13) should preferably be included (not shown in the figure).

Inflow Estimator Module

All the above-described modules benefit if flow measurements are available at a flow line outlet and upstream and downstream each buffer volume to be controlled. However, such measurements may often not be available. The Inflow Estimator module is a soft sensor that estimates the (transient) flow rates of oil and/or water and/or liquid and/or gas that enter or leave one or more processing units in an oil and gas production system. The Inflow Estimator module may be used stand alone or in any combination with the Ramp-Up, Overload Avoidance, or Outflow Smoothening modules. A special case of this is the estimation of oil, water and gas flow rates that enter an inlet separator. The estimates are typically based upon selected process measurements, such as measurements of flows, levels, pressures, temperatures, and valve openings that are located in the production system. How the estimation is actually performed depends on which measurements are available. The estimation may be based on conservation of mass, energy and/or momentum (balance equations) and/or empirical relation(s), including relations between pressure/volume/temperature and properties such as density and viscosity, using historical and/or on-line measurements. The examples below illustrate how the Inflow Estimator module may work.

Example 1

Figure 14:
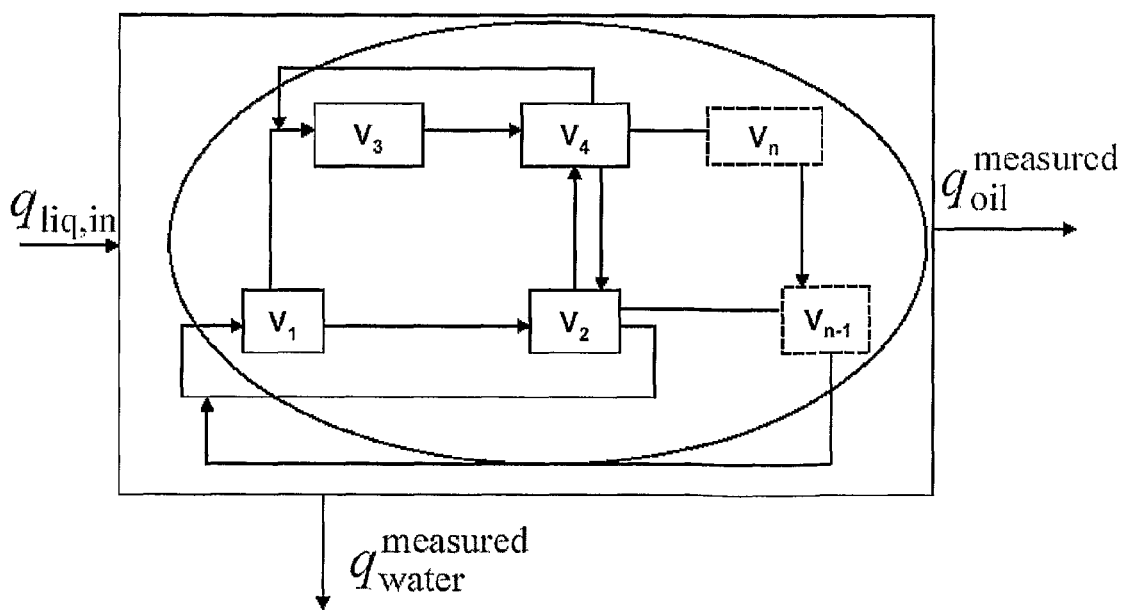
FIG. 14 illustrates a concept of estimating inflows by a so-called Inflow Estimator module.

Generally, in order to use the Inflow Estimator module a sub processing system is defined to which the unknown flow rates (which are to be estimated) are input and to which there are available measurements of the flows leaving the defined sub processing system. In addition, the defined system should preferably have liquid level measurements and gas pressure and temperature measurements such that the volume of oil, water, and gas in the sub processing system can be calculated. An example of estimating inlet flow rate(s) of liquid is shown in FIG. 14.

From the mass balance of the sub processing system, the inflow liquid rate(s) can be estimated as:

$$q_{liq,in} = \frac{d}{dt} V_{tot,liq} + q_{water}^{measured} + q_{oil}^{measured} = \frac{d}{dt} \sum_i V_{i,liq} + q_{water}^{measured} + q_{oil}^{measured}$$

where $q_{liq,in}$ [m³/s] is the unknown inflow rate of liquid to be estimated $q_{water}^{measured}$ [m³/s] is the measured outflow rate of water $q_{oil}^{measured}$ [m³/s] is the measured outflow rate of oil $V_{tot,liq}$ [m³] is the total liquid (oil and water) volume in the system $V_i$ [m³] is the liquid volume in buffer tank i Hence, the inflow liquid rate(s) can be estimated based on measurement(s) of the outflow liquid rate(s) and the rate-of-change of the associated liquid volume(s) $d/dt(V_{i,liq})$ in the system.

Example 2

Figure 15:
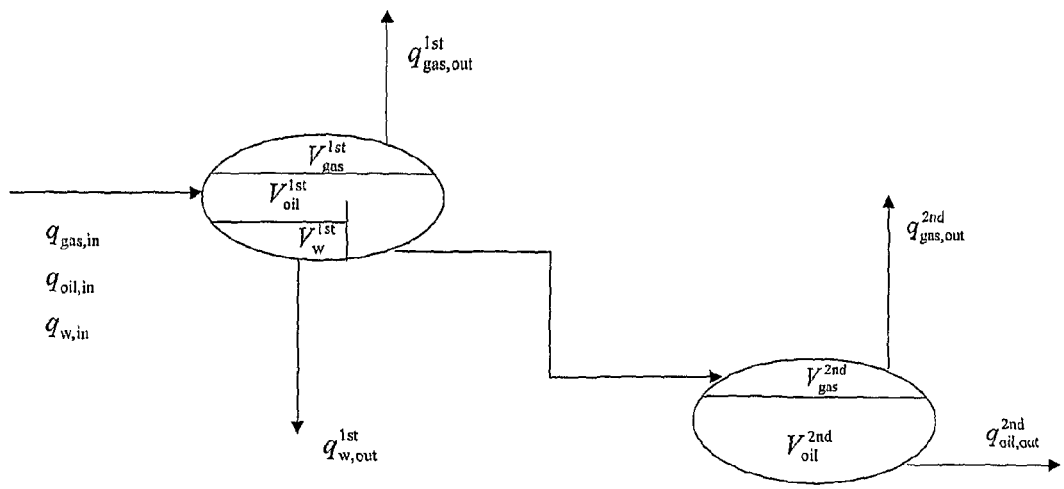
FIG. 15 shows a system for which the inflows are estimated by the Inflow Estimator module.

Another example is to estimate the flow rates of oil, water, and gas entering a first stage separator in a two-stage separator train, see FIG. 15. Here, the following measurements are assumed to be available:

Water ($q_{w,out}^{1st}$) and gas ($q_{gas,out}^{1st}$) flow rates out of 1st stage separator Oil flow rate out of 2nd stage separator ($q_{oil,out}^{2nd}$)

Water and oil level of 1st stage separator

Gas pressure ($p_{gas}^{1st}$) and temperature ($T_{gas}^{1st}$) of 1st stage separator Oil level of 2nd stage separator Gas pressure of 2nd stage separator ($p_{gas}^{2nd}$)

The level measurements are used for calculating the volume of oil ($V_{oil}^{1st}$), water ($V_w^{1st}$), and gas ($V_{gas}^{1st}$) in the first stage separator, and the volume of oil ($V_{oil}^{2nd}$) and ($V_{gas}^{2nd}$) in the second stage separator.

Assuming that the ideal gas law is valid, the gas inflow rate can be estimated, based on mass balance, by $$q_{gas,in} = \frac{MW_{gas}}{\rho_{gas}^{1st}} \left( \frac{\dot{p}_{gas}^{1st} V_{gas}^{1st} + p_{gas}^{1st} \dot{V}_{gas}^{1st}}{R_g T_{gas}^{1st}} + \frac{\rho_{gas}^{sc}}{MW_{gas}} q_{gas,out}^{1st} - \frac{p_{gas}^{1st} V_{gas}^{1st} \dot{T}_{gas}^{1st}}{R_{gas}(T_{gas}^{1st})^2} \right)$$

and the oil inflow rate can be estimated, based on mass balance, by $$q_{oil,in} = \frac{d}{dt}(V_{oil}^{1st} + V_{oil}^{2nd}) + q_{oil,out}^{2nd} + \frac{p_{gas,out}^{2nd}}{p_{oil,out}^{1st}} q_{gas,out}^{2nd}$$

whilst the water inflow rate can be calculated, based on mass balance, by $$q_{w,in} = \frac{d}{dt} V_w^{1st} + q_{w,out}^{1st}$$

Example 3

The simplest approach may be to use the above-mentioned equation (3) (on page 24) directly using a densitometer, measurements or estimates of the pressure drop across the valve, and the valve opening value. Alternatively, the above-mentioned equation (4) (on page 25) can be used.

Example of Module Interactions

Figure 16:
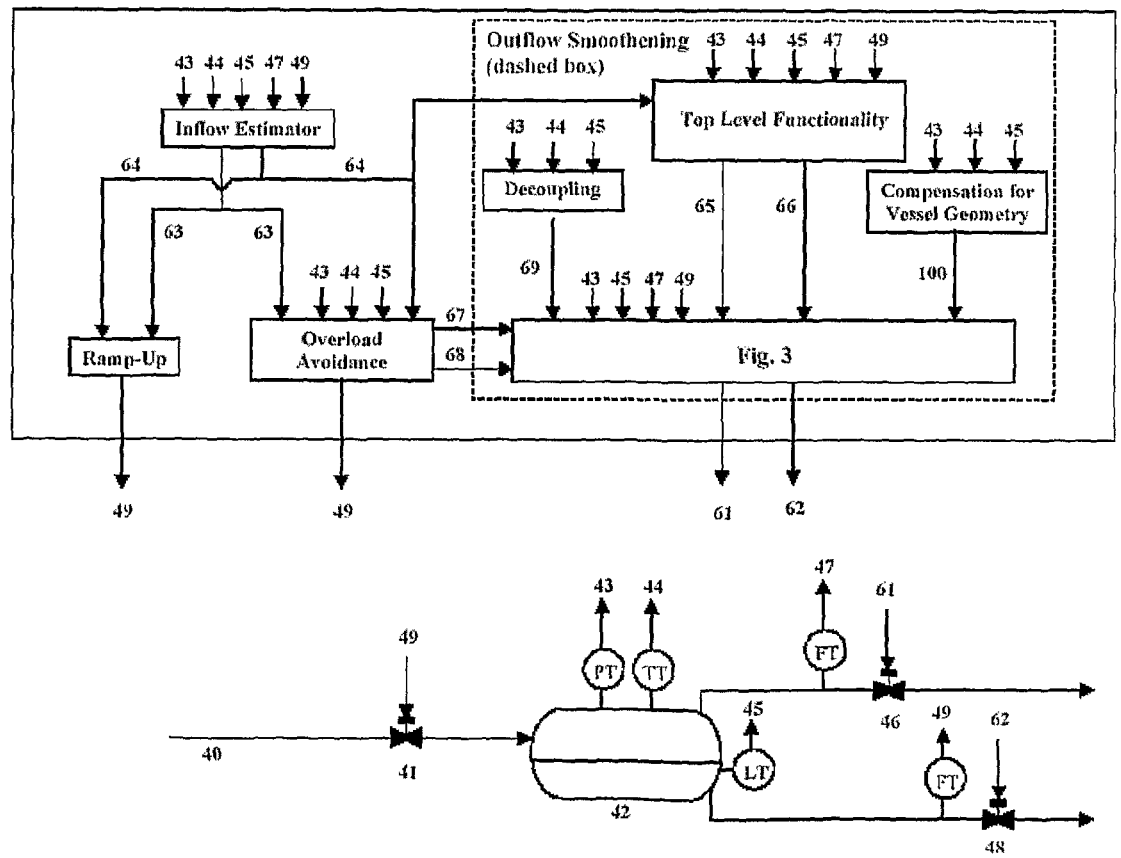
FIG. 16 shows an embodiment of an automatic feedback control system for control of a buffer tank by the use of the present invention.
Figure 17:
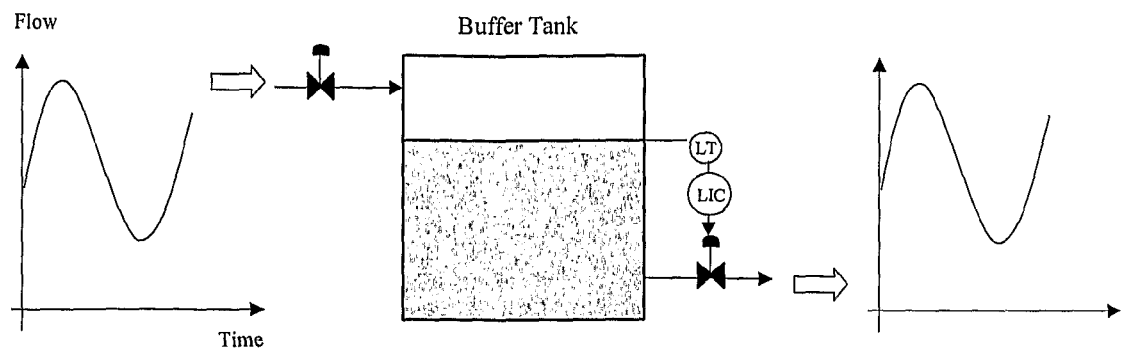
FIG. 17 illustrates tight level control in a buffer tank according to prior art.
Figure 18:
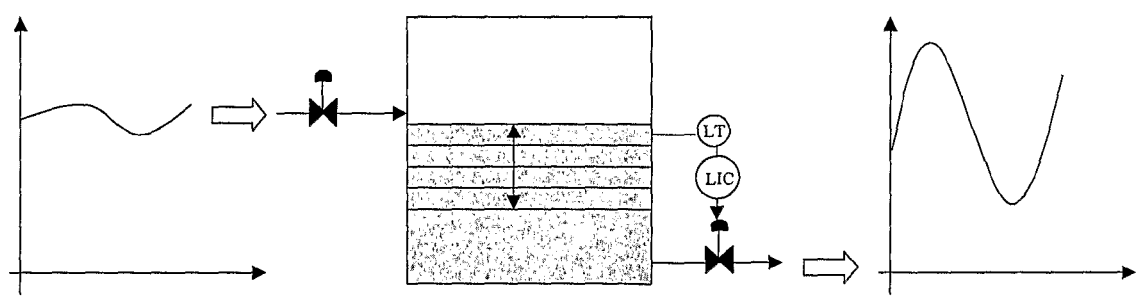
FIG. 18 illustrates the results of a controller which amplifies the disturbances entering a buffer tank according to prior art.
Figure 19:
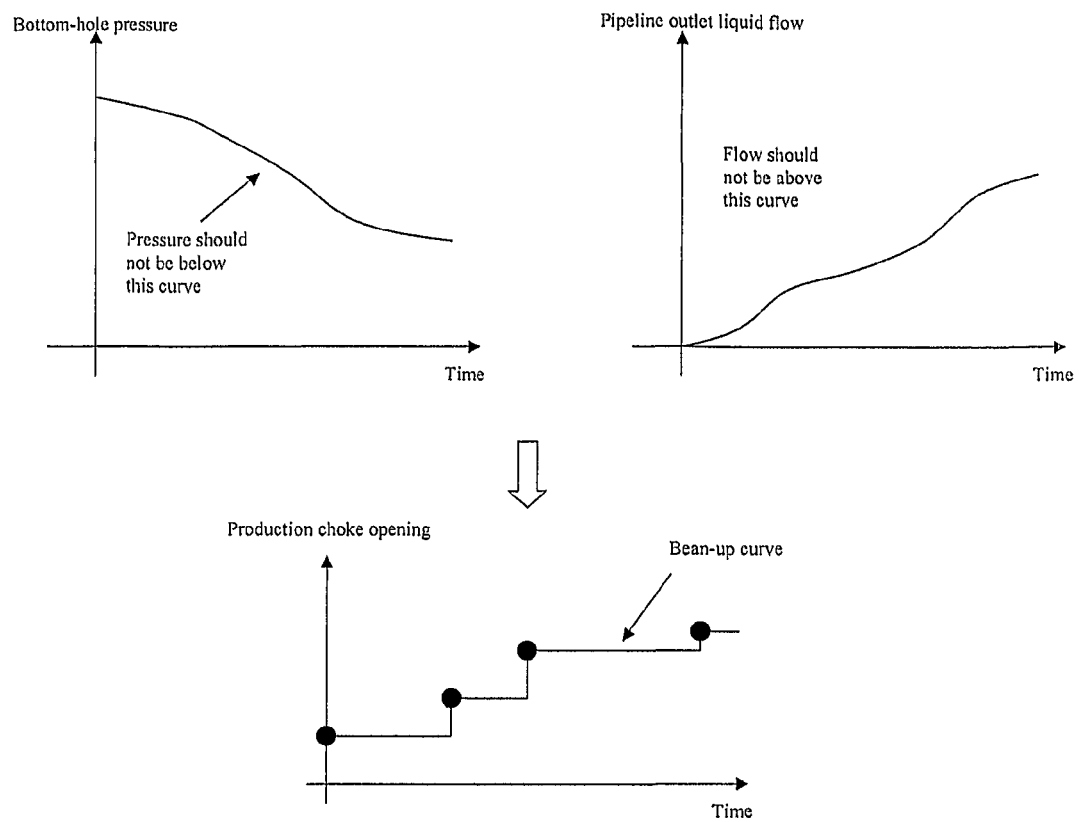
FIG. 19 illustrates how bean-up curves normally are designed according to prior art.

Consider the processing system and its associated automatic feedback control system shown in FIG. 16. For simplicity only one buffer tank is dealt with in this example. However, it is straightforward to extend the example to an arbitrary number of buffer tanks, such as buffer tanks of an entire processing facility.

A flow line 40 has a valve 41 located at its outlet. The buffer tank is assumed to be a two-phase (gas/liquid) separator 42 with measurements of gas pressure PT (signal 43), gas temperature TT (signal 44), and liquid level LT (signal 45). The outlet gas flow is controlled using a valve 46 and measured by a gas flow meter FT (signal 47). The outlet liquid flow is controlled using a valve 48 and measured by a liquid flow meter FT (signal 49).

The control system comprises the functional modules: Inflow Estimator, Overload Avoidance, Outflow Smoothening, and Ramp-Up interacting with each other as shown in FIG. 16. The Outflow Smoothening module consists of sub modules: A top Level functionality (e.g. the third sub module as described above), a Decoupling and Compensation for vessel geometry functionality (e.g. the second sub module as described above), and a part of the Outflow Smoothening module indicated as "FIG. 3" in the figure (e.g. the first sub module as described above). The control system uses measurements 43, 44, 45, 47, and 49 as input signals in order to control the valve openings of valve 41 (signal 49), valve 46 (signal 61), and valve 48 (signal 62). Since there are no measurements of the separator inflow, the Inflow Estimator module estimates this flow based on measurements 43, 44, 45, 47 and 49 by using the method as described above for this module. The output signals 63, 64 from the Inflow Estimator module are dynamic estimates of a gas flow rate and dynamic estimates of a liquid flow rate into the gas/liquid separator 42. These estimates are used by the Ramp-Up module, the Overload Avoidance module, and the top level (third) sub-module of the Outflow Smoothening module. The Ramp-Up module uses these estimates for automatic feedback control 49 of the inlet valve 41 such that the production is preferably continuously ramped-up in an optimal manner tracking a ramp-up curve. The Overload Avoidance module uses measurements of the gas pressure 43 and liquid level 45 in the buffer tank 42 in addition to the inflow rate estimates given by the Inflow Estimator module. Depending on the specific condition, this module might also use the measurement of the gas temperature 44. The output signals of the Overload Avoidance module are values/set points for the valve opening 49, and set points for the outlet gas flow and outlet liquid flow 67, 68 from the separator 42.

The top level (third) sub-module of the Outflow Smoothening module uses measurements 43, 44, 45, 47, 49 and inflow estimates given by the Inflow Estimator module. It calculates outlet flow set points for gas and liquid 65, 66. These set points 65, 66 are sent to the Set point Administrator of FIG. 3 of the Outflow Smoothening module. The Decoupling functionality calculates set point corrections (signal 69) for the outlet gas flow and liquid flow such that the liquid level and the gas pressure are decoupled from each other. It uses measurements 43, 44, and 45 as inputs. The Compensation of Vessel Geometry functionality uses measurements 43, 44 and 45 as inputs and calculates set point corrections (signal 100) for the outlet liquid flow and gas flow such that variable process gains due to the geometry of the vessel are cancelled out. Based on the current situation, the Set point Administrator selects the set points for the outflows from the set points provided by the top level (third) sub-module of the Outflow Smoothening module and the Overload Avoidance module, as indicated in FIG. 16 by signals 67 and 68. Since there is a top level (third) sub-module of the Outflow Smoothening module present, the Master Controllers' set points (of FIG. 3) are not used. The selected set points are sent to the flow controllers of FIG. 3 whose outputs are the values for the gas valve opening 61 and liquid valve opening 62.

The method according to the present invention may be implemented as software, hardware, or a combination thereof. A computer program product implementing the method or a part thereof comprises a software or a computer program run on a general purpose or specially adapted computer, processor or microprocessor. The software includes computer program code elements or software code portions that make the computer perform the method using at least one of the steps according to the inventive method.

The program may be stored in whole or part, on, or in, one or more suitable computer readable media or data storage means such as a magnetic disk, CD-ROM or DVD disk, hard disk, magneto-optical memory storage means, in RAM or volatile memory, in ROM or flash memory, as firmware, or on a data server.

It will be understood by those skilled in the art that various modifications and changes may be made to the present invention without departure from the scope thereof, which is defined by the appended claims.

The invention claimed is:

1. A method for automatic slug control in an oil and/or gas production system by using feedback control, said oil and/or production system includes a processing unit, a flow line, and a flow control upstream of the processing unit, said method comprising:

receiving measurements from said processing unit of at least one of level, pressure, outflow rate or load indicator of said processing unit;

estimating with a processor at least one inflow rate of any liquid or gas into the processing unit based, in part, on the received measurements from said processing unit or received measurements of pressure across the flow control;

calculating with the processor settings for said flow control based on at least two controlled variables comprising at least one of said received measurements of level, pressure, outflow rate or load indicator of said processing unit and the at least one estimated inflow rate, including compensating for nonlinearities of said flow control; and regulating the flow control in the oil and/or gas production system in accordance with the calculated settings;

wherein compensating for said nonlinearities comprises canceling effects of nonlinearities; and wherein changes in flow control gains are canceled based on a calculation of a ratio of change in associated flow rates to change in associated flow control settings, and changes in process gain are canceled based on a calculation of a ratio of rate-of-change in controlled variables, to changes in associated flow rates.

2. The method according to claim 1, wherein calculating settings of said flow control comprises:

mitigating flow rate variations throughout said production system, or parts thereof, by utilizing available buffer capacity in said production system, or parts thereof, avoiding that said production system, or parts thereof, is being overloaded based on at least one load indicator while ensuring that a throughput of said production system, or parts thereof, is not restricted, or automatically ramping up the throughput of said production system, or parts thereof, based on on-line measurements and/or estimates.

3. The method according to claim 1, wherein said estimating is carried out by using an Inflow Estimator module.

4. The method according to claim 2, wherein said mitigating, avoiding overload, automatically ramping up are carried out by using control modules.

5. The method according to claim 4, wherein said modules are functional modules comprising algorithms based on dynamic and/or steady state components.

6. The method according to claim 4, wherein said modules are all used in an integrated manner so as to co-operate or interact with each other in any combination comprising two or more of the modules, or are used separately.

7. The method according to claim 3, wherein the Inflow Estimator module is used stand alone or in any combination with the control modules.

8. The method according to claim 3, wherein when a controlled variable is a flow rate and not measured, an estimate is obtained from the Inflow Estimator module.

9. The method according to claim 1, wherein said changes in process gain are canceled based on a calculation of the ratio of rate-of-change in controlled variables, to changes in associated flow rates based on information about vessel geometry.

10. The method according to claim 2, wherein mitigating flow rate variations comprises:
calculating available buffer capacity based on information about a range of variation for said controlled variables.

11. The method according to claim 10, further comprising:
determining said information about the range of variation for said controlled variables either by the method itself or externally or provided by a user.

12. The method according to claim 2, wherein mitigating flow rate variations further comprises:
calculating settings for said one or more controls that minimizes flow rate variations given the available buffer capacity without restricting the production throughput.

13. The method according to claim 12, wherein calculating settings for said one or more controls further comprises:
compensating for at least a portion of couplings between said flow control and said controlled variables.

14. The method according to claim 2, wherein said avoiding overload comprises:
calculating said load indicators by measuring and/or estimating values of at least one variable that holds information about the load of the production system relative to the maximum and/or minimum load.

15. The method according to claim 14, wherein said variables include control valve or choke openings, liquid levels, pressures, temperatures, flow rates, densities, compressor rpm, and compressor power or derived measurements as a function thereof.

16. The method according to claim 14, further comprising:
automatically keeping said load indicators non-positive and without restricting the production throughput.

17. The method according to claim 2, wherein ramping up the throughput of said production system, or parts thereof, comprises:
measuring or estimating said controlled variables, and calculating said flow control settings such that said controlled variables track at least one ramp-up curve for said controlled variables as a function of time.

18. The method according to claim 17, wherein calculating said flow control settings comprises calculating said one or more controls settings for each said ramp-up curves and selecting the said one or more controls settings associated with the least violation of ramp-up curve constraints associated with said ramp-up curves.

19. The method according to claim 18, wherein calculating comprises:
redefining the controlled variables and/or the ramp-up curves such that decreasing the flow control settings results in decreased violation of the associated ramp-up curve constraints, wherein said step of selecting is carried out by selecting the smallest flow control setting.

20. The method according to claim 17, wherein said controlled variable is a flow rate of said production system.

21. The method according to claim 17, wherein said controlled variable is a pressure of said production system.

22. The method according to claim 17, wherein said method is carried out automatically and continuously.

23. The method according to claim 1, wherein estimating said flow rates is based on a mass balance and/or an energy balance and/or a momentum balance and/or an empirical relations associated with said production system, or parts thereof, using historical and/or on-line values of said measurements and/or estimates.

24. The method according to claim 1, wherein estimating is based on at least a dynamic mass balance.

25. The method according to claim 23, wherein said empirical relations provide information about the relationship between said measurements and/or estimates and said estimated flow rates.

26. The method according to claim 1, wherein estimating comprises:
calculating liquid inflow rates by using the mass balance equation:

$$q_{liq,in} = \frac{d}{dt} V_{tot,liq} + q_{water}^{measured} + q_{oil}^{measured} = \frac{d}{dt} \sum_i V_{i,liq} + q_{water}^{measured} + q_{oil}^{measured}$$

of the production system, or part(s) thereof, where the inflow liquid rate(s) $q_{liq,in}$ is estimated based on measurement(s) of the outflow liquid rate(s) $q_{water}^{measured}$, $q_{oil}^{measured}$ and the rate-of-change of the associated liquid volume(s) $d/dt(V_{i,liq})$ in the system.

27. The method according to claim 1, wherein the calculation of settings is based on at least one of a Model Predictive Control algorithm and a set of dynamic feedback algorithms.

28. The method according to claim 27, wherein the set of dynamic feedback algorithms comprises Proportional+Integral+Derivative controllers.

29. A control unit for automatic slug control in an oil and/or gas production system by using feedback control, said oil and/or production system includes a processing unit, a flow line, and a flow control upstream of the processing unit, the control unit comprising:
a hardware module configured to receive measurements from said processing unit of at least one of level, pressure, outflow rate or load indicator of said processing unit;
a hardware module configured to estimate with a processor at least one inflow rate of any liquid or gas into the processing unit based, in part, on the received measurements from said processing unit or received measurements of pressure across the flow control;
a hardware module configured to calculate with the processor settings for said flow control based on at least two controlled variables comprising at least one of said received measurements of level, pressure, outflow rate or load indicator of said processing unit and the at least one estimated inflow rate, including compensating for nonlinearities of said flow control; and
a hardware module configured to regulate the flow control in the oil and/or gas production system in accordance with the calculated settings;
wherein compensating for said nonlinearities comprises canceling effects of nonlinearities; and
wherein the hardware module configured to calculate settings is configured to cancel changes in flow control gains based on a calculation of a ratio of change in associated flow rates to change in associated flow control setting and is configured to cancel changes in process gain based on a calculation of a ration of rate-of-change in controlled variables to change in associated flow rates.

30. A computer program product, comprising:
a non-transitory computer readable medium; and
computer program instructions recorded on the computer readable medium and executable by a processor for carrying out a method for automatic slug control in an oil and/or gas production system by using feedback control, said oil and/or production system includes a processing unit, a flow line, and a flow control upstream of the processing unit, said method comprising:

receiving measurements from said processing unit of at least one of level, pressure, outflow rate or load indicator of said processing unit;

estimating with a processor at least one inflow rate of any liquid or gas into the processing unit based, in part, on the received measurements from said processing unit or received measurements of pressure across the flow control;

calculating with the processor settings for said flow control based on at least two controlled variables comprising at least one of said received measurements of level, pressure, outflow rate or load indicator of said processing unit and the at least one estimated inflow rate, including compensating for nonlinearities of said flow control; and regulating the flow control in the oil and/or gas production system in accordance with the calculated settings;

wherein compensating for said nonlinearities comprises canceling effects of nonlinearities;

wherein changes in flow control gains are canceled based on a calculation of a ratio of change in associated flow rates to change in associated flow control settings, and changes in process gain are canceled based on a calculation of a ration of rate-of-change in controlled variables, to changes in associated flow rates.

31. The computer program product according to claim 30, wherein the method further comprises supplying the computer program instructions via a network.

32. The computer program product according to claim 31, wherein the network comprises the internet.

33. A method for automatic slug control in an oil and/or gas production system by using feedback control, said oil and/or production system includes a processing unit, a flow line, and a flow control upstream of the processing unit, said method comprising:

receiving measurements from said processing unit of at least one of level, pressure, outflow rate or load indicator of said processing unit;

estimating with a processor at least one inflow rate of any liquid or gas into the processing unit based, in part, on the received measurements from said processing unit or received measurements of pressure across the flow control;

calculating with the processor settings for said flow control based on at least two controlled variables comprising at least one of said received measurements of level, pressure, outflow rate or load indicator of said processing unit and the at least one estimated inflow rate, including compensating for nonlinearities of said flow control; and regulating the flow control in the oil and/or gas production system in accordance with the calculated settings;

wherein estimating comprises:

calculating liquid inflow rates by using the mass balance equation:

$$q_{liq,in} = \frac{d}{dt}V_{tot,liq} + q_{water}^{measured} + q_{oil}^{measured} = \frac{d}{dt}\sum_i V_{i,liq} + q_{water}^{measured} + q_{oil}^{measured}$$

of the production system, or part(s) thereof, where the inflow liquid rate(s) $q_{liq,in}$ is estimated based on measurement(s) of the outflow liquid rate(s) $q_{water}^{measured}$, $q_{oil}^{measured}$ and the rate-of-change of the associated liquid volume(s) $d/dt(V_{i,liq})$ in the system.

* * * * *